US012102581B2

(12) United States Patent
Riveron

(10) Patent No.: US 12,102,581 B2
(45) **Date of Patent: *Oct. 1, 2024**

(54) TREATMENT FORCE APPLICATION DEVICE

(71) Applicant: Rudy Alexander Riveron, San Diego, CA (US)

(72) Inventor: Rudy Alexander Riveron, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/483,144

(22) Filed: Oct. 9, 2023

(65) Prior Publication Data

US 2024/0041687 A1 Feb. 8, 2024

Related U.S. Application Data

(63) Continuation of application No. 16/902,254, filed on Jun. 15, 2020, now Pat. No. 11,779,503.

(Continued)

(51) Int. Cl.
*A61H 1/00* (2006.01)
*A61H 23/04* (2006.01)

(52) U.S. Cl.
CPC ............. *A61H 1/008* (2013.01); *A61H 23/04* (2013.01); *A61H 2201/0149* (2013.01);

(Continued)

(58) Field of Classification Search
CPC .................... A61H 1/008; A61H 23/04; A61H 2201/0149; A61H 2201/0157;

(Continued)

(56) References Cited

U.S. PATENT DOCUMENTS 1,958,936 A 5/1934 Richard et al.
2,180,775 A * 11/1939 Stevens .................. A61H 1/008
606/237

(Continued)

FOREIGN PATENT DOCUMENTS

DE 102011075144 A1 3/2012
KR 20160063797 A 6/2016
WO 2015187092 A1 12/2015

OTHER PUBLICATIONS

International Search Report and Written Opinion mailed Sep. 29, 2020 for International Patent Application No. PCT/US2020/037828 (8 pages).

*Primary Examiner* — Michael R Reid
*Assistant Examiner* — Tyler A Raubenstraw
(74) *Attorney, Agent, or Firm* — Perkins Coie LLP

(57) ABSTRACT

A treatment force application device includes a proximal end having a weight and having a support for a practitioner; a distal end having a treatment interface configured for applying a therapeutic treatment including at least a treatment force; and a connection between the support and the treatment interface. The connection is lockably adjustable by the practitioner to establish a placement of the treatment interface relative to the support. The weight is sufficient to substantially prevent movement of the treatment interface relative to the support when the connection is locked. The support enables movement of the practitioner to provide a practitioner force, and the practitioner force is transferred from the support to the treatment interface through the connection.

20 Claims, 14 Drawing Sheets

Related U.S. Application Data

(60) Provisional application No. 62/862,108, filed on Jun. 16, 2019.

(52) U.S. Cl.
CPC ................ *A61H 2201/0157* (2013.01); *A61H 2201/0173* (2013.01); *A61H 2201/0207* (2013.01); *A61H 2201/0214* (2013.01); *A61H 2201/10* (2013.01); *A61H 2201/1666* (2013.01); *A61H 2201/1671* (2013.01); *A61H 2201/5058* (2013.01)

(58) Field of Classification Search
CPC .... A61H 2201/0173; A61H 2201/0207; A61H 2201/0214; A61H 2201/10; A61H 2201/1666; A61H 2201/5058; A61H 1/00; A61H 1/006; A61H 7/002; A47C 7/62; A47C 9/025
See application file for complete search history.

(56) References Cited

U.S. PATENT DOCUMENTS 3,754,787 A 8/1973 Garber
5,295,728 A 3/1994 Schaevitz
5,545,177 A * 8/1996 Coseo .................... A61H 39/04 601/134
6,258,047 B1 * 7/2001 Muramatsu ............ A61B 5/103 601/115
6,267,737 B1 7/2001 Meilus
7,025,736 B1 4/2006 Lawrence
7,320,667 B1 1/2008 Hanna
8,790,371 B2 7/2014 Dyer et al.
8,939,500 B2 1/2015 Voigt et al.
10,039,929 B1 8/2018 Schwarz et al.
2002/0158492 A1 10/2002 Ko et al.
2003/0090131 A1 * 5/2003 Roleder ................. A47C 9/005 297/195.11
2005/0092330 A1 * 5/2005 Henry .................. A61G 15/125 606/240
2005/0216061 A1 9/2005 Kim et al.
2005/0288157 A1 12/2005 Santos-Munné et al.
2007/0270727 A1 11/2007 Khorassani
2007/0282228 A1 * 12/2007 Einav ............... A63B 21/00181 600/300
2009/0069728 A1 * 3/2009 Hoffmann ................ A61B 8/08 601/46
2009/0182436 A1 7/2009 Ferrara
2009/0249551 A1 * 10/2009 Klemm .................. A47C 16/00 5/657
2010/0004100 A1 * 1/2010 Rahimi .............. A63B 23/0233 482/96
2010/0222723 A1 9/2010 Hoffmann
2011/0004048 A1 * 1/2011 Brunelle ............... A61M 21/02 600/27
2011/0190808 A1 * 8/2011 Li .......................... A61B 17/00 606/204
2011/0218465 A1 * 9/2011 Yang ........................ A61H 1/00 601/18
2012/0253245 A1 10/2012 Stanbridge
2012/0319444 A1 12/2012 Onopa
2013/0066245 A1 3/2013 Dagan
2014/0336549 A1 11/2014 Yang
2014/0361584 A1 12/2014 Boenigk et al.
2015/0231016 A1 8/2015 Stearns et al.
2015/0305967 A1 * 10/2015 O'Neal ............. A61H 15/0078 601/117
2016/0089294 A1 * 3/2016 Guillaume ........... A61G 15/007 128/845
2016/0324717 A1 11/2016 Burton
2017/0013960 A1 * 1/2017 Richardson ............ A61B 90/60
2017/0079871 A1 3/2017 Zhang
2017/0196762 A1 7/2017 Antros
2017/0266077 A1 * 9/2017 Mackin .............. A61G 13/1235
2018/0116903 A1 5/2018 Matsushita
2018/0200141 A1 7/2018 Wersland et al.
2018/0360684 A1 12/2018 Pierce et al.
2019/0014908 A1 1/2019 Smith et al.
2019/0076315 A1 3/2019 Jamesapollos
2019/0281984 A1 * 9/2019 Richardson ............ A47C 7/004
2020/0121089 A1 4/2020 Rucci et al.
2020/0121556 A1 * 4/2020 Tian ....................... A61H 39/02
2020/0197257 A1 * 6/2020 DiDuro .................. G16H 50/30
2020/0281805 A1 9/2020 Qiu et al.
2020/0383868 A1 12/2020 Gloyd

* cited by examiner

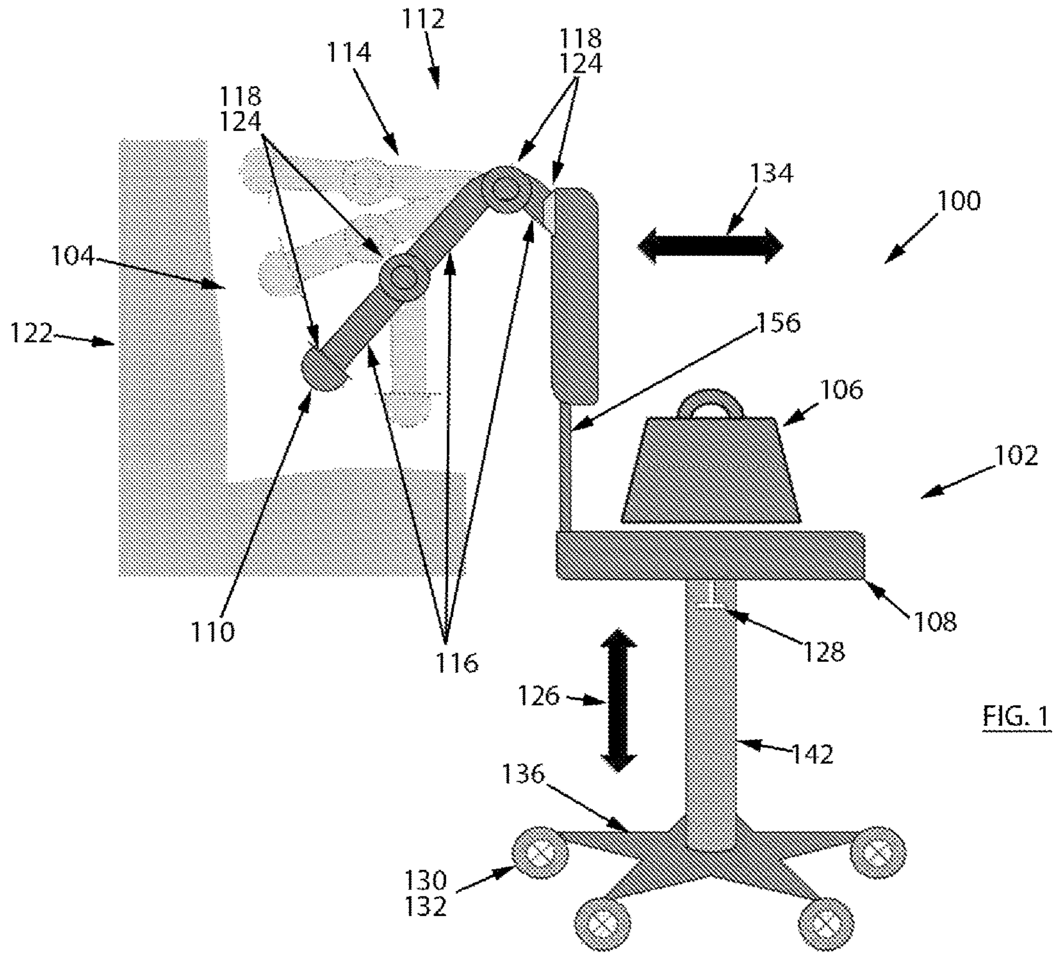
FIG. 1
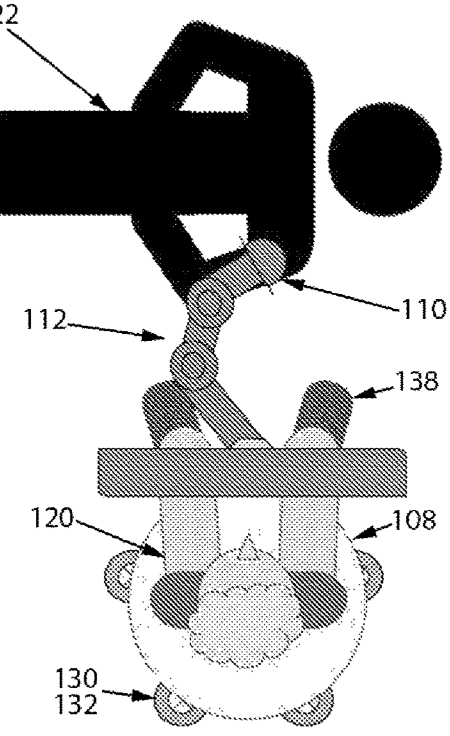
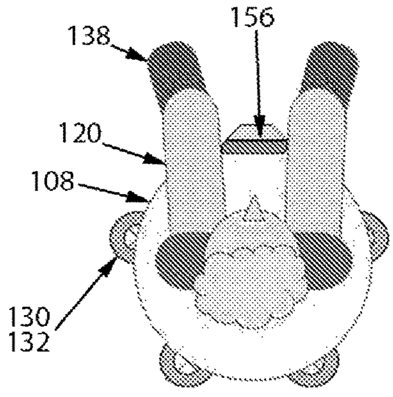
FIG. 2
FIG. 3
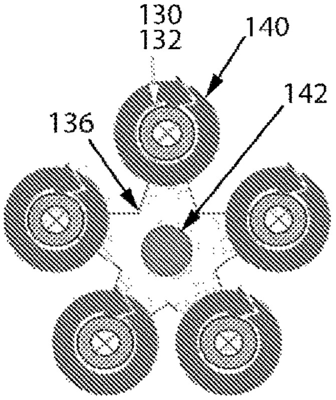
FIG. 4

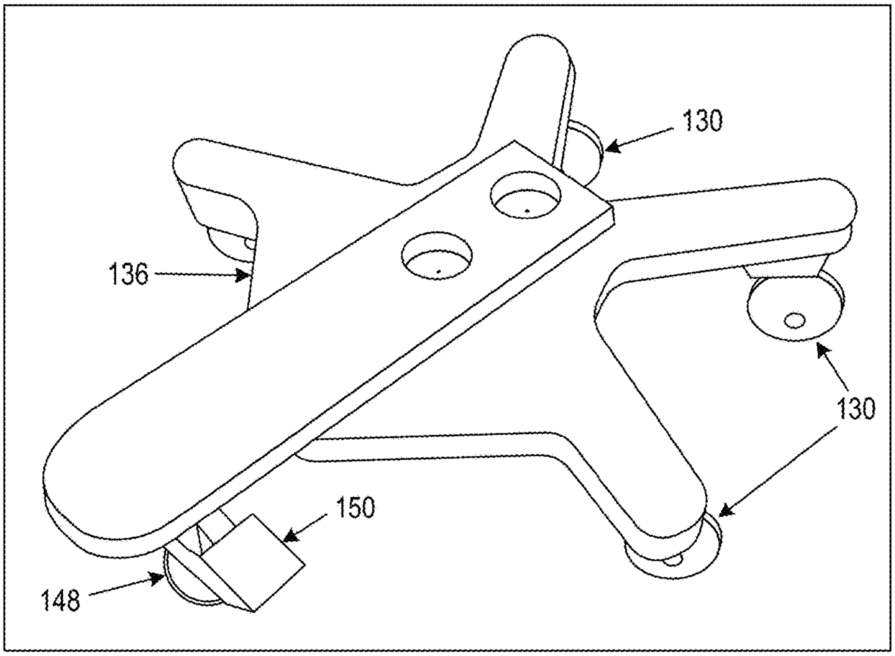
FIG. 20
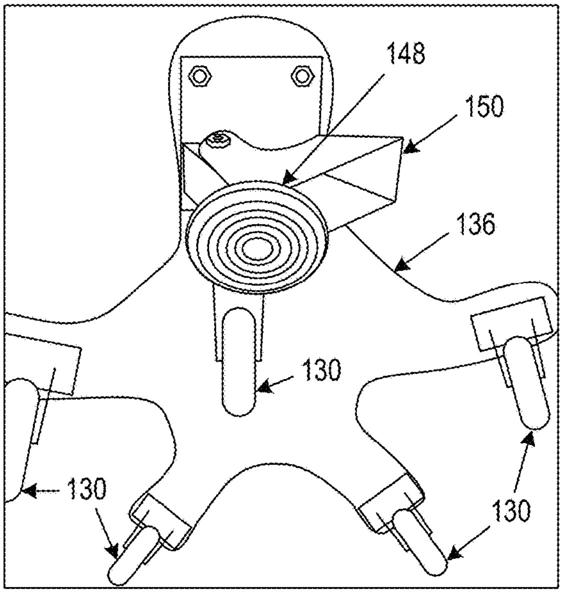
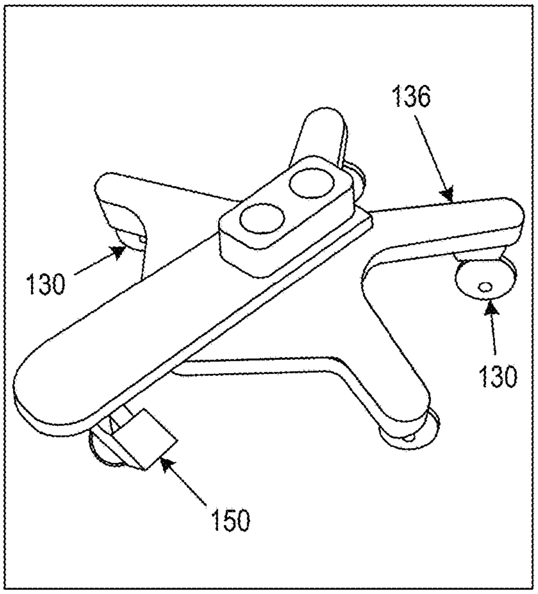
FIG. 22
FIG. 21

TREATMENT FORCE APPLICATION DEVICE

CROSS-REFERENCE TO RELATED APPLICATION(S)

The present application is a continuation of and claims priority to U.S. patent application Ser. No. 16/902,254, filed Jun. 15, 2020, which claims the benefit of priority to U.S. Provisional Application No. 62/862,108, filed Jun. 16, 2019. The entire contents of the above-noted applications are incorporated herein by reference in their entirety.

TECHNICAL FIELD

The invention relates generally to manual therapy equipment, and specifically to a treatment force application device.

BACKGROUND

Manual therapy has existed for thousands of years as the intentional manipulation of body tissues for the relief of pain, discomfort, and other ailments that may affect living creatures in a myriad of criterion from purely physical to mental, emotional, spiritual and others. It may even predate the human species as animals have been observed utilizing surfaces in the wild to provide themselves with pressure to various bodily surface areas.

Its acceptance in the West as a medical intervention may be said to have begun in a more standardized way roughly around the 1500s and has continued to develop due to individuals such as Ambroise Paré, Per Henrik Ling, and Dr. Janet Travell, to name just a few. The earliest depiction of therapeutic touch can be seen in cave paintings as far back as 15,000 BCE. Eastern styles of bodywork have also been a notable style of application. At the present time, numerous modalities and methodologies exist in many domains that utilize tissue manipulation for therapeutic benefit, in both professional and informal settings. While therapeutic touch has typically been provided in informal settings for the administration of mostly pleasurable effects, its administration for pathologies and pain is becoming further substantiated and ubiquitous and necessitates a more rigorous scientific and less fatiguing approach to be available in clinical applications.

Further, although forms of therapeutic touch and force application have been present throughout history and cultures, practitioners have lacked a means for both defining and providing said force in both an easy and reproducible manner. Additionally, as forces are typically applied using no other sensor than the human brain, quantifying these forces has been limited.

Current methods of force application to biological tissue, largely the human body, rely primarily on effortful actions of another human body, creating wear and tear on the applicator while inevitably resulting in inconsistent levels of force, depth, angles of entry, and duration.

Current devices used to mitigate damage to the human force applicator's natural appendages still require the practitioner to engage with the devices by gripping and bracing skeletal muscle to create rigid joint angles for extended periods, which leads to potential repetitive stress injuries and other ailments. Other devices for force application to tissues typically utilize a tool against a steady surface such as a wall, bed, or floor to be utilized while the human body interfaces around the tool with various levels of coordination, accuracy, and support. Bracing or leaning can be an essential component of producing any kind of compressional force. Objects can be pinned between other fixed objects in order for pressure and force to be created, exerted, and maintained. When human skeletal muscle acts as a force producing brace, results may be nonuniform and efforts may be discontinued from either the inability to apply force to the desired location at the proper angle and/or the force created is insufficient or excessive creating discomfort and/or injury.

In the field of manual therapy, there currently exists no mechanisms for providing repeatable application of force in treatment, as the practice relies solely on a human practitioner applying force in response to client reports. This lack of reproducibility leads to improper long-term care and results. In addition, the field has a high number of reported workplace-related injuries, which can lead many practitioners to leave the profession.

SUMMARY

The invention advantageously fills the aforementioned deficiencies by providing a treatment force application device and a method for its use, as an alternative to other manual therapy devices and methods.

The treatment force application device for use on biological tissue preferably operates to serve at least two purposes, initially targeted for use in a manual therapy or similar setting, which are achieved by removing direct interaction between a human practitioner and a patient. The device allows for greatly improved accuracy and repeatability of treatment, thus potentially improving overall success rates, while providing ideal conditions for data collection. The removal of any direct contact with a human practitioner reduces or eliminates occupational risks normally associated with the profession. Both of these goals serve to provide a standardized level of care to biological tissue with the application of force with minimal effort and fatigue. The treatment force application device is preferably designed to allow practitioners with injuries, structural inadequacies, and neuromuscular control issues to apply force to biological tissues in a superior, or at least an identical manner to practitioners without such restrictions.

The invention provides, among other things, a system and method of applying force onto biological tissues in a manner consistent with forces a human body could create using only its natural appendages. The system and method can be used in lieu of or in addition to systems and methods for applying force in traditional manners applied directly by a human practitioner. An intent of the system and method is to enable greater accuracy and repeatability of treatment while minimizing or eliminating any physical risks of a human practitioner related to his or her occupation.

The following descriptions of features and aspects of the invention are not meant to limit the scope of the invention, but rather to merely provide examples of preferred embodiments. Terms and phrases used are intended to have and convey their dictionary and common usage meanings, as well as or including, without limitation, the meanings specified. To the extent that any refer to functionality or purpose in any way, then they are intended to convey, in addition to their dictionary and common usage meanings, any arrangement, combination, or interaction of physical objects, hardware, and/or software that is suitable to any degree, whether partially or fully, for accomplishing and/or effecting the function or intended result. Further, in addition to any preferred embodiments described, the invention encompasses embodiments having features and aspects that fall into the broadest possible categories to which the described preferred features and aspects belong.

For additional clarity in such regard, it should be understood that references to biological tissues include without limitation all organized matter known or unknown that comprises smaller units such as cells, fibrils, collagenous materials and other organic molecules. Biological tissues preferably targeted by the invention include without limitation human and animal tissues such as, for example, integumentary, myofascial, neural, connective, osseous, and cartilaginous.

In preferred embodiments, a treatment force application device includes a proximal end having a weight and having a support for a practitioner; a distal end having a treatment interface configured for applying a therapeutic treatment including at least a treatment force; and a connection between the support and the treatment interface; wherein the connection is lockably adjustable by the practitioner to establish a placement of the treatment interface relative to the support; and the weight is sufficient to substantially prevent movement of the treatment interface relative to the support when the connection is locked.

As an example, in certain embodiments a treatment force application device can include a treatment station having a weighted base with a seat for a practitioner, and a treatment module connected to the base by an arm with segments connected to one another and to the treatment module and the base by universal joints that can be locked and unlocked, such that a practitioner sitting in the seat and facing the treatment module can lock and unlock the joints and, when the joints are unlocked, move and position the treatment module in real space relative to the seat, and, when the joints are locked, have the treatment module held in position relative to the seat by the rigidity of the arm and the weight of the base.

The force can be any type of force, including without limitation treatment forces and non-treatment forces, compression forces, tension forces, shearing forces, torsion forces, bending forces, rotation forces, twisting forces, positive forces, negative forces (such as, for example, in the case of suction techniques and cupping techniques), magnetic forces, elemental forces, pressure forces, deformation forces, forces caused by natural phenomena, and known and unknown forces of any type, and be caused or allowed to be caused by any means, known or unknown. The forces can have any desired amounts, in any combination, of a variety of characteristics, including without limitation strength, duration, angle, depth, velocity, speed, rate, tempo, duration, rhythm and oscillation. Accordingly, the forces and the use of the device can be useful for a variety of treatments including without limitation medical, chiropractic, osteopathic, massage, general therapy, manual therapy, neuromuscular therapy, trigger point, kneading/petrissage, stroking/effleurage, manual lymphatic drainage, lymphotherapy, cross friction, longitudinal release, gua sha, myofascial therapies, skin rolling, percussion/tapotement, pin and strip, dermoneuromodulation, neurodynamics, circulatory, instrument assisted tissue mobilization, heat/cold application, proprioceptive neuromuscular facilitation, muscle activation, rocking and shaking, traction, structural integration, visceral manipulation, Eastern style bodywork, acupressure, tuina, traditional Chinese medicine techniques, shiatsu, Thai massage, aromatherapy, cranio-sacral therapy, soft tissue techniques, applied kinesiology, muscle testing, anma, bone setting, tapping, muscle energy techniques, myotherapy, sports massage, reiki, energy work, biofeedback, crystal healing, cupping, breathwork, magnet therapy, reflexology, active release, rolfing, physiotherapy, spinal adjustment, chiropractic adjustment, spinal manipulation, joint manipulation/mobilization, osteopathic manipulation, heat, cold, vibration, pulsing, ultrasound, radiation, laser, dry needling, stretching, body sculpting, and dermatological treatments and techniques.

The support can be any type of accommodation for any type of user. The accommodation can be any type of accommodation including without limitation a support, recess, seat, chair, space, platform, or ledge. The user can be any type of user including without limitation a user, practitioner, operator, surgeon, chiropractor, nurse, therapist, masseur, masseuse, or technician. The proximal and distal ends can be any aspects of the device that are spaced from one another, and are not necessarily the most proximal and most distal portions of the device.

The treatment interface can be any type of application feature including without limitation treatment interfaces, non-treatment interfaces, data-gathering interfaces, informational interfaces, and control interfaces. The treatment interface in preferred embodiments has a contact surface that is shaped, designed, or otherwise configured to interact with and apply force, pressure, and deformation through the fundamental loads of compression, tension, bending, torsion and shear, to biological tissues from the outermost layer of the tissues without puncturing, scratching or cutting the tissues. The treatment interface can include one or more instruments or tools. The treatment interface can be of any shape including but not limited to a rod, cone, sphere, cylinder, bar (such as, for example, a scraping bar), whether full, partial, or elongated shapes of any of the foregoing.

Further in preferred embodiments, the treatment interface acts primarily on the deeper layers of biological tissues through depth of pressure, and tolerable levels of tissue deformation and other effects such as vibration, ultrasound, heat, cold, and other noninvasive methods. The treatment interface is preferably made from materials reasonably safe to biological tissues that are sufficiently inert to cause no harm, or limited harm, to the biological tissues, such as, for example, stainless steel, natural rubber, wood, and non-toxic plastics.

The therapeutic treatment can be any type of application including without limitation applications, treatments, and therapies, of any nature, including without limitation therapeutic, prophylactic, preventative, chiropractic, medical and holistic.

The adjustability of the connection can be any ability or capability to change or be changed in any respect. The lockability of the connection can be any ability or capability to secure in or be secured in, and release from or be releasable from a changed situation. Being lockably adjustable by a user can be the user being able to directly or indirectly cause a result, or direct or control persons, physical objects, hardware and/or software to cause a result. The placement of the treatment interface relative to the support can be as to any direction, dimension, or configuration.

The weight can be fixed, temporary, or variable, and from any source, whether inherent in, integral with or separate from the device. The sufficiency of the weight can mean that the weight, at least when it is being utilized or otherwise relied upon, is at least heavy enough to cause, or used or useful to cause the intended result. The movement that is substantially prevented can be as to any direction, dimension, or configuration. The substantial nature of the prevention can be that although there may in certain embodiments be deformations of materials, movements of attached or related components due to imprecise spacing tolerances, and other such limitations of physical technology, the treatment interface is fixed relative to the support to the extent that it can be in order to achieve the intended functional purpose.

Preferably, the connection is adjustable in six degrees of freedom by manipulation of the treatment interface within reach of the practitioner.

As an example, further discussing the previous example, in certain embodiments each of the universal joints can articulate in six degrees of freedom, and the treatment module is within arm's reach of the practitioner when the practitioner is sitting in the seat, such that the practitioner can sit in the seat facing the treatment module, reach out and grab the treatment module, and, when the universal joints are unlocked, move the treatment module in real space in multiple directions and orientations, and then lock the universal joints to have the treatment module remain in place at the desired location.

The adjustability of the connection can be in fewer than six degrees of freedom including without limitation one or more degrees of freedom. The manipulation can be effecting a change to, or in, any aspect or situation of the treatment interface. Being within reach can mean that manipulation or control of manipulation of the treatment interface is within the sphere of influence of the practitioner.

Preferably, the connection has a plurality of joints that each can be locked and unlocked independently, so that any permutation of any combination of locked and unlocked joints is possible. Accordingly, the connection can preferably be locked as to any direction or axis independent of any other direction or axis, and can accordingly, or otherwise, be used to maintain and hold pressure in a given orientation while retaining freedom as to other orientations.

Preferably, the connection includes at least one arm having at least one securable and releasable lock for selectively preventing and allowing adjustment of the connection.

As an example, further discussing the previous example, in certain embodiments the locks on the universal joints can be alternately individually secured and released, and when a lock is secured, it prevents adjustment of the connection at its associated joint, and when a lock is released, it allows adjustment of the connection at its associated joint, such that the practitioner can unlock one or more joints to allow adjustment, and lock one or more joints to prevent adjustment.

The connection can be any connection including without limitation connections including any number of arms with any number of segments or sections for each arm. The connection can include without limitation connections that utilize any mechanical, hydraulic, pneumatic, electrical, hardware, and software components. The arm or arms can include one lock or multiple locks. The lock or locks can be located on, in, about or adjacent to, or otherwise or in any manner or through any mechanism associated with the arm or arms, or arm segment or segments.

Being securable and releasable can mean having an ability to change, or to be changed, in any respect, and to, respectively, secure in, or be securable in, and release from, or be releasable, from such changed situation. Adjustment of the connection can be any change to, or in, any aspect or situation of the connection. Selectively can mean any degree of control, whether partial or full, in choosing either result. Preventing and allowing can mean having an ability to change, or to be changed, in any respect, and to, respectively, disable, block, make not possible, etc., on the one hand, and enable, unblock, make possible, etc. on the other hand, such change.

In preferred embodiments, a distal arm segment attaches to the treatment interface and can be made from materials similar to those described above with regard to the treatment interface, and can range in parameters such as length, width, height, and weight. Preferably, a distal joint associated with the distal arm segment is a location at which the arm can be locked after being positioned for treatment, and may include an articulation mechanism such as, for example, a ball and socket joint, hinge joint, or other freely mobile joint capable of locking by numerous mechanisms. Preferably, subsequent to an additional arm segment, a proximal articulation is present and also may include any joint type, locking mechanism, size or other desired variation. Preferably, the arm segments and joints can be placed in a variety of positions to direct the treatment interface toward a target site.

Preferably, the support is adjustable with respect to at least one dimension of the practitioner.

As an example, further discussing the previous example, in certain embodiments the height, width, and/or orientation of the seat can be adjusted to make it more comfortable for the practitioner.

Adjustment of the connection can be any change to, or in, any aspect or situation of the support. A dimension of the practitioner can be any characteristic or aspect of the practitioner.

Preferably, movement of the support is enabled by at least one wheel. Further preferably, the proximal end includes at least one securable and releasable lock for selectively preventing and allowing movement of the wheel.

As an example, further discussing the previous example, in certain embodiments the support can be moved horizontally. In embodiments in which the support and the base are fixed to one another (permanently or temporarily), horizontal movement of the base can cause horizontal movement of the support. In some of such embodiments, the horizontal movement can be enabled by one or more wheels on the bottom of the base, such that the base can be rolled across the surface on which it is placed (for example, a floor). In some embodiments, the feet of the practitioner sitting on the support can reach the surface and accordingly the practitioner can use his or her feet to pull the base across the surface when the wheels are not locked, to cause such horizontal movement.

The movement of the support can be any motion, as to any amount or frequency, and can be caused or enabled by any type of movement or transport mechanism or device including without limitation wheels, rollers, sliders, magnets, and forces.

The proximal end can include one lock or multiple locks. The lock or locks can be located on, in, about or adjacent to, or otherwise or in any manner or through any mechanism associated with the proximal end, support, wheels, or other component of the device. Being securable and releasable can mean having an ability to change, or to be changed, in any respect, and to, respectively, secure in, or be securable in, and release from, or be releasable, from such changed situation. Selectively can mean any degree of control, whether partial or full, in choosing either result.

Preventing and allowing movement can mean having an ability to change, or to be changed, in any respect, and to, respectively, disable, block, make not possible, etc., on the one hand, and enable, unblock, make possible, etc. on the other hand, such change. The movement of the wheel can be any motion, as to any amount or frequency, and can be caused or enabled by any type of movement or transport mechanism or device including without limitation rollers, sliders, magnets, and forces.

In preferred embodiments, the support serves as a mass distribution platform and accordingly may support and accommodate any variable or non-variable mass that can balance on the platform and be supported by the base. Preferably, lockable dual axis mobility enablers (such as, for example, wheels) on the base have full 360 degree rotation capability and accordingly can be used to move the device to any desired location and further can be used to brace, brake, and fully lock through the use of a braking mechanism such as, for example, brake or lock pedal. The mass distribution platform can have any desired shape, size, thickness dimension, density, or other physical characteristic. Preferably, a spatial relationship between the mass distribution platform and the base is established by a support column having a height that is adjustable by a height adjustment lever or other similar mechanism. Preferably, the height adjustment lever is capable of mechanically reducing the distance between the mass distribution platform and the base using gravity or other natural phenomena through mechanisms such as, for example, hydraulic or pneumatic systems, or motorized gears. Preferably, a relationship between the mass distribution platform and the base establishes a primary agent of force transference through the remaining device elements such as, for example, the joints, arm segments, and the treatment interface, ultimately terminating in the biological tissues themselves.

Preferably, the support enables movement of the practitioner to provide a practitioner force, and the practitioner force is transferred from the support to the treatment interface through the connection. Further preferably, the support enables at least one of vertical, horizontal, and rotational movement of the practitioner, the rotational movement being about at least one of three axes perpendicular to one another. Still further preferably, the support includes at least one flexible brace against which the practitioner can press to provide the practitioner force.

As an example, further discussing the previous example, in certain embodiments the seat can have extending vertically from it a brace to which the connection between the seat and the treatment module is attached, and the brace can be adjacent the practitioner's torso when the practitioner is sitting in the seat, such that the practitioner can lean against the brace with the practitioner's torso to, when the connection is locked, cause the connection to move in accordance with the force, and consequently cause the treatment module to move in accordance with the force. In some of such embodiments, this practitioner force can be used to apply treatment or otherwise affect the target of the force.

The practitioner force can be separate from the treatment force, or part or all of the treatment force. The movement of the practitioner to provide the force can be any motion, as to any amount or frequency, and be caused or enabled by any type of movement or transport mechanism or device including without limitation wheels, rollers, sliders, magnets, and forces. The movement can be caused or enabled by the practitioner moving himself or herself under the practitioner's own power. The force can be any type of force, including without limitation treatment forces and non-treatment forces, positive and negative forces, magnetic forces, elemental forces, forces caused by natural phenomena, and known and unknown forces of any type, and be caused or allowed to be caused by any means, known or unknown.

Transferring can mean conveying, imparting, providing, transmitting, or replicating. Through can mean by way of, by use of, due to, along, or within. Enabling can mean allowing, causing or helping to allow or cause a result.

Vertical, horizontal, and rotational movements can mean such directional and positional changes with respect to any reference points or axes. Flexible can mean changeable in at least one physical characteristic. Brace can mean, without limitation, any physical or forceful barrier. Press can mean any manner of applying or causing to be applied, any type of force.

In preferred embodiments, a proximal joint is attached to the support by way of a flexible brace against which a practitioner can create horizontal vectors of force production through actions such as, for example, leaning when the practitioner is seated on the support. Preferably, the connection of the support to the proximal joint by the brace brings the arm into force transference cohesion with the proximal end of the device.

In preferred embodiments, a practitioner or other operator can be a variable mass on the mass distribution platform and be positioned with his or her legs straddling the flexible brace and his or her torso facing the flexible brace to facilitate leaning forward against the brace to provide a practitioner force. In preferred embodiments, the brace is strong enough to support the weight of the arm segments and joints, and the flexible brace and other parts of the device can withstand and resist to the extent necessary the forces being exerted on it from both the biological tissues, whose density, elasticity, and structure must be countered, as well as the practitioner. Preferably, the flexible brace is constructed from any sufficiently durable, weight bearing material such as, for example, steel, rod iron, and other materials that resist snapping. Further in preferred embodiments, the practitioner has access to the ground or floor by the practitioner's feet, which enables repositioning of the base, and accordingly the device as a whole, using the dual axis mobility enablers. The dual axis mobility enablers preferably have a range of motion of 360 degrees and can be locked. Although the base may have any desired number of dual axis mobility enablers, in preferred embodiments of the invention the base has five lockable dual axis mobility enablers.

In preferred embodiments, the described position of the practitioner allows for movement of the device using the practitioner's legs and feet through friction contact with the floor, while also providing the practitioner with access, within arm's reach, to the treatment interface, arm segments, and joints for positioning the treatment interface over biological tissues and enabling optimal positioning when height adjustments become necessary with variance in practitioner heights. Preferably, through the described mechanisms, a precise degree of force, pressure, and tissue deformation can be applied to a precise location, at a precise angle, for a desired duration with minimal effort for the practitioner while providing a reliable degree of stillness at the tissue site.

Subtle adjustments to force applications can, in preferred embodiments, be refined through the use of a practitioner's legs and feet when the base (21) is free to move. In certain embodiments, motorized mobility enablers may additionally or alternatively be utilized to allow for operation of the device by practitioners with restrictions such as leg, hip, knee and foot inadequacies.

Preferably, the connection between the support and the treatment interface has varying ranges of motion due to a combination of joint types that enable the treatment interface to achieve any angle and position relative to the biological tissues, similar to the capability of appendages of a well-functioning human body.

Further in preferred embodiments, the configuration of the connection including without limitation the arm segments and joints provides unimpeded movement of the treatment interface in the sagittal, coronal, and transverse planes through every conceivable range of motion. Further in preferred embodiments, not only the ability of the dual axis mobility enablers to rotate through 360 degrees, but also the ability of the adjustable height support column to rotate 360 degrees relative to the mass distribution platform provides for 360 degrees of rotation for the platform and any variable mass placed on it, such as a practitioner.

Preferably, the treatment interface includes a contact surface that is extendible and retractable to selectively provide the treatment force. Further preferably, the treatment force increases with extension of the contact surface and decreases with retraction of the contact surface. Still further preferably, increases and decreases of the treatment force respectively due to the extension and retraction are logarithmic.

As an example, further discussing the previous example, in certain embodiments the treatment module can have a contact surface that can be the primary point of interaction with the patient or other target of the treatment. In some of such embodiments, the surface can be extended outwardly, and retracted inwardly such that if the contact surface is adjacent the patient or other target of the treatment, extending the surface causes a force to be applied, and retracting the surface relieves the force. In some of such embodiments, extending the surface causes a force to be applied according to a logarithmic scale, and retracting the surface causes a force to be relieved according to a logarithmic scale.

The contact surface can be any part of any component that can contact or be brought into contact with, or otherwise be made to contact, a point of interest on a target of the treatment force. The target can be a subject, patient, client, or customer. Extendible and retractable can mean, respectively, moving away or forth from, and moving back into or toward. Selectively can mean any degree of control, whether partial or full, in choosing either result. Provide can mean partially or fully cause, enable, or facilitate.

As to the force increasing with extension and decreasing with retraction, the invention also encompasses embodiments in which the force decreases with extension and increases with retraction, and embodiments in which there is any change in value with any change in position. As to the increases and decreases being according to a logarithmic scale, the invention encompasses embodiments in which the increases and/or decreases are according to other scales, formulas, patterns or trajectories.

Preferably, the therapeutic treatment further includes at least one of heat, cold, moisture, vibration, pulsing, ultrasound, radiation, chemicals, and medicine.

As an example, further discussing the previous example, in certain embodiments, the treatment applied by the treatment module can be any type or manner of affecting the patient or other target of the treatment, including without limitation those listed.

Preferably, the treatment interface is configured for obtaining data related to use of the device. Further preferably, the treatment interface includes at least one sensor. Further preferably, the data is selected from the group consisting of biometric data, treatment data, physical data, mechanical data, force data, environmental data.

As an example, further discussing the previous example, in certain embodiments, the treatment module can collect data related to the use of the device, and can in that regard have one or more sensors suitable for such collection. The data can be any type of data, including without limitation those listed.

The configuration can include one or more detectors, sensors, sensitive components, triggers. Obtaining can mean gathering, sensing, coming into possession or control of, and causing the possession or control of.

The data can mean data of any type, format, or language, and any carrier thereof. The use to which the data relates can be any use by any person, machine, computer, user, practitioner, subject, target, client, customer, buyer, seller, manufacturer, maintenance personnel, or maintenance equipment. Related can mean any manner or aspect pertaining to, involving, similar to, caused by, or effected by.

The sensor can be any device, whether hardware or software or both, that is useful for obtaining data, or causing data to be obtained.

In preferred embodiments, a method of applying a treatment force includes, from a support at a proximal end of a treatment force application device, the device having a weight at the proximal end and having a distal end having a treatment interface and a connection between the support and the treatment interface, the treatment interface being configured for application of a therapeutic treatment including at least the treatment force; adjusting and locking the connection to establish a placement of the treatment interface relative to the support, the weight being sufficient to substantially prevent movement of the treatment interface relative to the support when the connection is locked; and applying the treatment force using the treatment interface.

As an example, further discussing the previous example, in certain embodiments the method of the invention can include without limitation the use, by the practitioner, of the described device. More particularly, for example, the method can include sitting in the seat in an orientation facing the treatment module, grabbing and moving the treatment module while one or more of the universal joints are unlocked, locking the universal joints when the treatment module is at the desired location such that the treatment module is held in position relative to the seat by the rigidity of the arm and the weight of the base, and then using the treatment module to apply the treatment force.

The method can be undertaken by any user, whether person, machine, or computer, and through any means, whether purposely, randomly, automated, or by artificial intelligence. The steps described, and any other steps described herein, can be undertaken in any order, and fewer or more steps can be included without departing from the scope of the invention. The components, features, and functionalities of described in the method are in certain embodiments as they are broadly described above and elsewhere herein.

Further preferably, as to the method, the treatment interface includes a contact surface that is extendible and retractable to selectively provide the treatment force, the treatment force logarithmically increases with extension of the contact surface and logarithmically decreases with retraction of the contact surface, and the method further includes extending and retracting the contact surface to selectively provide the treatment force.

As an example, further discussing the previous example, in certain embodiments, the method of the invention can include without limitation extending and retracting the contact surface to apply, or withdraw, the force as needed to effect the treatment, where extending the surface causes the force to be applied, and retracting the surface causes the force to be relieved. In some of such embodiments, extending the surface causes the force to be applied according to a logarithmic scale, and retracting the surface causes the force to be relieved according to a logarithmic scale.

Further preferably, as to the method, the treatment interface is configured for obtaining data related to use of the device, and the method further includes using the treatment interface to obtain the data.

As an example, further discussing the previous example, in certain embodiments, the method of the invention can include without limitation using the treatment module to collect the data related to use of the device, where the treatment module is configured for such collection.

Further preferably, as to the method, the support includes at least one flexible brace against which the practitioner can press in at least one of a vertical, horizontal, and rotational movement to provide a practitioner force, the practitioner force being transferred from the support to the treatment interface through the connection, and the method further includes pressing against the brace to provide the practitioner force.

As an example, further discussing the previous example, in certain embodiments, the method of the invention can include without limitation leaning against the flexible brace extending from the seat to, when the connection is locked, cause the connection to move in accordance with the force, and consequently cause the treatment module to move in accordance with the force.

It should be understood that with regard to elements of the invention discussed herein that move, articulate, interact with other elements, or otherwise change, or can be moved, articulated, caused to interact with other elements, or otherwise changed, any and all systems and methods for accomplishing such actions are encompassed by the invention including without limitation manual, motorized, hydraulic powered, pneumatic powered, automated, and computerized systems and methods.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

FIG. 1 illustrates a treatment force application device of an embodiment of the invention, in a side view.

FIG. 2 illustrates a practitioner sitting on a support of a treatment force application device of an embodiment of the invention, in a top view.

FIG. 3 illustrates a practitioner sitting on a support of a treatment force application device of an embodiment of the invention and using the device to treat a patient, in a top view.

FIG. 4 illustrates a base of a treatment force application device of an embodiment of the invention, in a top view.

FIGS. 20-22 illustrate a base of a treatment force application device of an embodiment of the invention, in various views.

DETAILED DESCRIPTION

Figure 5:
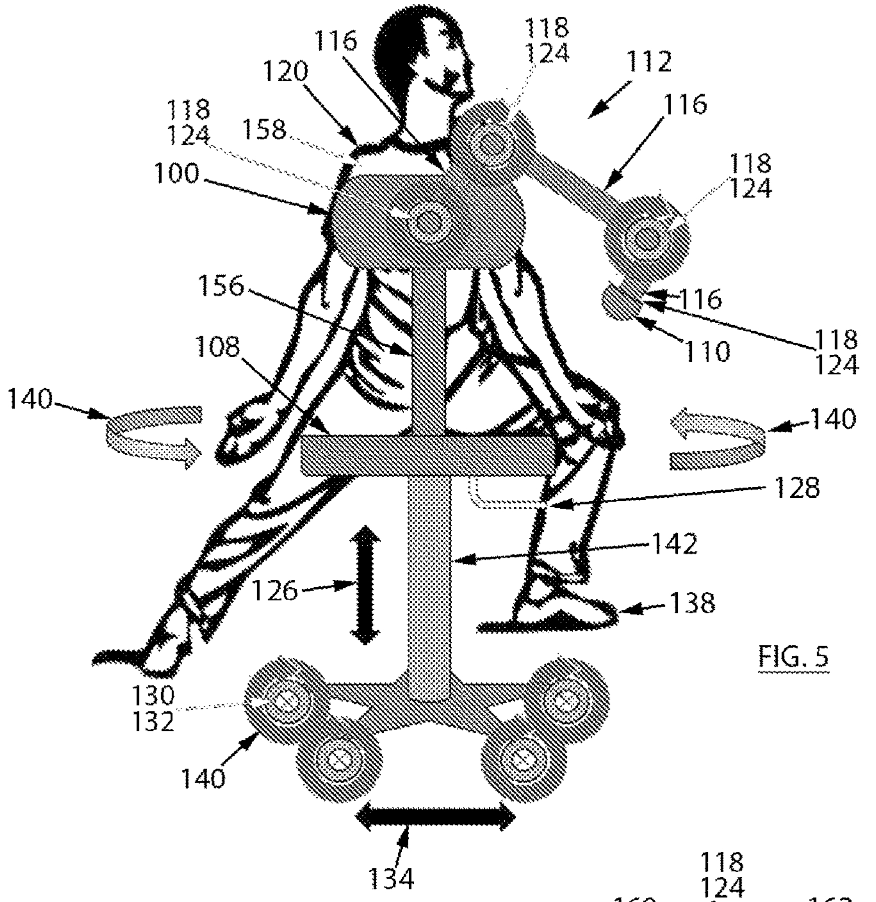
FIG. 5 illustrates a practitioner sitting on a support of a treatment force application device of an embodiment of the invention, in an anterior view.

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

The invention provides, in preferred embodiments, a treatment force application device or instrument.

Referring now to FIGS. 1-5, a treatment force application device 100 of a preferred embodiment of the invention is illustrated. The device 100 has a proximal end 102 and a distal end 104. The proximal end 102 has a weight 106 and a support 108 for a practitioner 120. The distal end 104 has a treatment interface 110 configured for applying a therapeutic treatment including at least a treatment force. The device 100 further has a connection 112 between the support 108 and the treatment interface 110. The connection 112 is lockably adjustable by the practitioner 120 to establish a placement of the treatment interface 110 relative to the support 108. The weight 106 is sufficient to substantially prevent movement of the treatment interface 110 relative to the support 108 when the connection 112 is locked. The device 100 is illustrated in FIG. 3 as being used to apply a treatment to a patient 122. Dotted outlines and ghost images of components of the connection 112 are used to illustrate that the treatment interface 110 can be pointed in multiple angles at a target site, such as the biological tissues of a patient 122.

In the illustrated embodiment, the treatment force application device 100 is a treatment station, with the proximal end 102 being a weighted base 136 and the support 108 being a seat for the practitioner 120. The treatment interface 110 is a treatment module and the connection 112 between the support 108 and the treatment interface 110 is an arm 114 with segments 116 connected to one another and to the treatment module and the support 108 by universal joints 118 that can be locked and unlocked, such that a practitioner 120 sitting in the seat and facing the treatment module can lock and unlock the joints 118 and, when the joints 118 are unlocked, move and position the treatment module in real space relative to the seat, and, when the joints 118 are locked, have the treatment module held in position relative to the seat by the rigidity of the arm 114 and the weight of the base 136.

In certain embodiments, the weight of the practitioner 120 is the weight 106 or provides the weight 106. In other embodiments, the weight of the base 136 is sufficient without the practitioner 120.

Further referring to FIGS. 1-5, the connection 112 is adjustable in six degrees of freedom by manipulation of the treatment interface 110 within reach of the practitioner 120.

In the illustrated embodiment, each of the universal joints 118 can articulate in six degrees of freedom as indicated by arrows surrounding each joint 118, and the treatment module is within arm's reach of the practitioner 120 when the practitioner 120 is sitting in the seat, such that the practitioner 120 can sit in the seat facing the treatment module, reach out and grab the treatment module, and, when the universal joints 118 are unlocked, move the treatment module in real space in multiple directions and orientations, and then lock the universal joints 118 to have the treatment module remain in place at the desired location.

Further referring to FIGS. 1-5, the arm 114 has a plurality of securable and releasable locks 124 for selectively preventing and allowing adjustment of the connection 112.

In the illustrated embodiment, each universal joint has a lock 124 that can be alternately secured and released. When the lock 124 is secured, it prevents adjustment of the arm 114 at the associated joint 118, and when the lock 124 is released, it allows adjustment of the arm 114 at the associated joint 118. The practitioner 120 can accordingly unlock one or more joints 118 to allow adjustment, and lock one or more joints 118 to prevent adjustment.

Referring also to FIGS. 29-34, a connection 112 and treatment interface 110 of a treatment force application device of an embodiment of the invention is illustrated in various views in operation for treatment of a patient 122, with the treatment interface 110 oriented by adjustment of the arm 114 segments 116 and joints 118 and locked in position using the locks 124, for application of the treatment force.

Referring also to FIGS. 35-38, a treatment force application device of an embodiment of the invention is illustrated in various partial views showing the support 108, flexible brace 156, treatment interface 110, and connection 112 with arm segments 116 and joints 118 with locks 124.

Further referring to FIGS. 1-5, the support 108 is adjustable with respect to a dimension of the practitioner 120. In the illustrated embodiment, the height of the seat can be adjusted by use of a height adjustment lever 128, to better accommodate the practitioner 120, as indicated by arrows 126.

Figure 17:
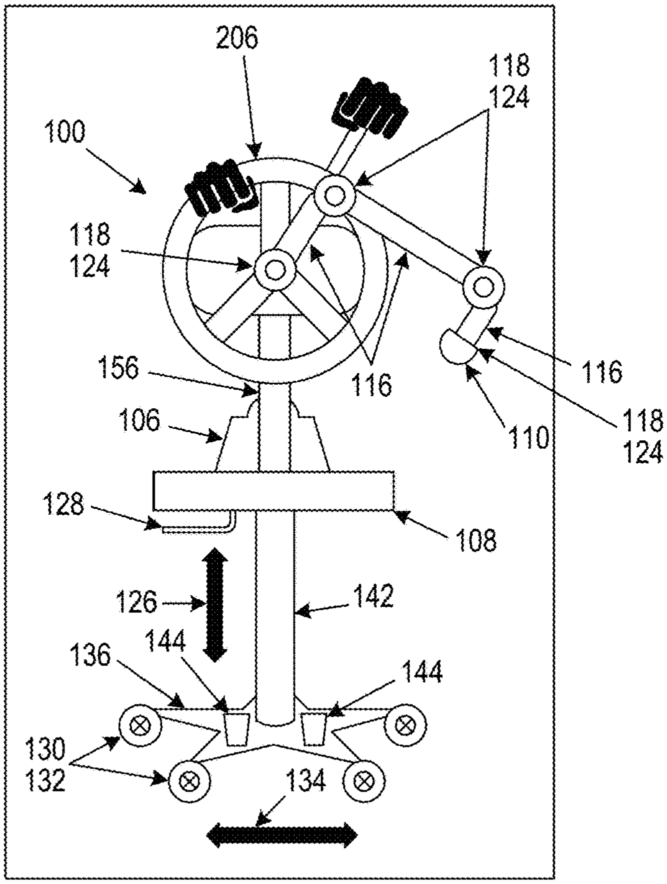
FIG. 17 illustrates connection manipulation features and movement locking features of a treatment force application device of an embodiment of the invention, in an anterior view.

Further referring to FIGS. 1-5 and also referring to FIG. 17, movement of the support 108 is enabled by one or more wheels 130, and the proximal end 102 of the device 100 includes one or more securable and releasable locks 132 for selectively preventing and allowing movement of the wheels 130. Although the invention is illustrated as including wheels for enabling movement of the support 108, the invention encompasses the use of any type of mobility enabler.

In the illustrated embodiment, the support 108 can be moved horizontally, as indicated by arrows 134. The support 108 and the base 136 are fixed to one another, and therefore horizontal movement of the base 136 causes horizontal movement of the support 108. The horizontal movement is enabled by a plurality of wheels 130 on the bottom of the base 136, such that the base 136 can be rolled across a floor. The practitioner's feet 138 can reach the floor and accordingly the practitioner 120 can use his or her feet 138 to pull the base 136 across the floor when the wheels 130 are not locked, to cause such horizontal movement.

Further in the illustrated embodiment, the support 108 can be rotated, as indicated by arrows 140, about an axis perpendicular to the floor. The rotation can be enabled by the wheels 130 when they are unlocked. The rotation can be enabled by a support column 142 configured to allow the seat to rotate relative to the base 136, including but not limited to when the wheels 130 are locked. Rotating the support 108 can be useful for placing the practitioner 120 in an operationally useful orientation, or for positioning the connection 112 or the treatment module.

Further referring to FIG. 17, with regard to securable and releasable locks 132 for selectively preventing and allowing movement of the wheels 130, the illustrated treatment force application device includes one or more brake pedals 144 in one or more locations (for example, on both sides of the base 136 as illustrated). The brake pedals 144 preferably can be operated to selectively slow, temporarily brace, and fully lock the wheels 130.

Figure 18:
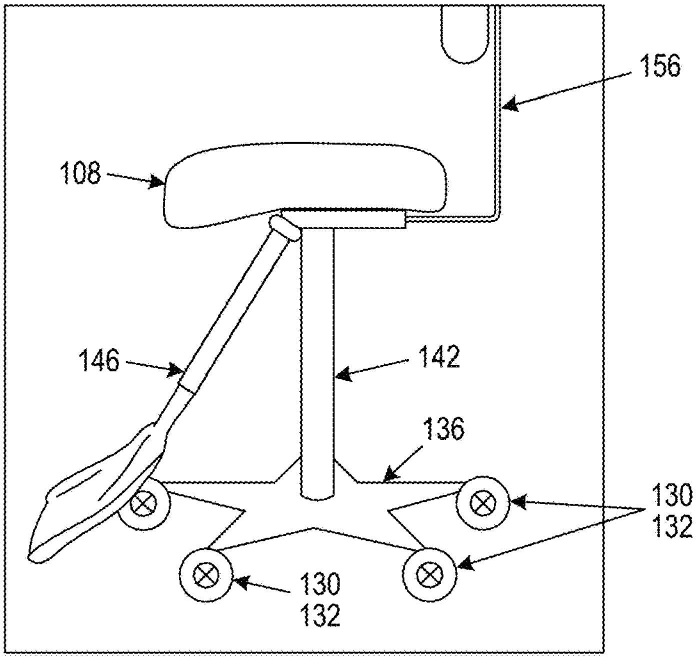
FIG. 18 illustrates a movement locking feature of a treatment force application device of an embodiment of the invention.

Further referring to FIG. 18, with further regard to securable and releasable locks 132 for selectively preventing and allowing movement of the wheels 130, the treatment force application device can additionally or alternatively include at least one anchor 146 in one or more locations (for example, extending from the bottom of the support 108 as illustrated). The anchor 146 preferably can be operated to selectively slow, temporarily brace, and fully lock the wheels 130. The anchor 146 also functions as a brace to enhance the stability of the connection 112, due to its inclusion in a force transfer conduit extending from the treatment interface 110, through the arm segments 116 and joints 118 of the connection 112, through the support 108, and through the anchor 146 to the floor.

Referring now to FIGS. 20-22, with further regard to securable and releasable locks 132 for selectively preventing and allowing movement of the wheels 130, the treatment force application device can in some embodiments include a base 136 having at least one rubber stopper 148 in one or more locations (for example, at the bottom of the support 108 as illustrated). The rubber stopper 148 preferably can be operated, by pressing on a foot pedal 150, to selectively slow, temporarily brace, and fully lock the wheels 130.

Although the invention is illustrated as including brake pedals 144, an anchor 146, or a rubber stopper 148 as a lock, the invention encompasses any type of locking element including without limitation a friction lock, bolt lock, magnetic lock, electronic switch, hydraulic brake, or rim brake.

Although the invention is illustrated as being configured for movement of the support 108 or base 136 by manual footwork of the practitioner 120, the invention encompasses any manner of transport including without limitation use of a motorized support 108 or base 136.

Further referring to FIGS. 1-5, the support 108 enables movement of the practitioner 120 to provide a practitioner force, and the practitioner force is transferred from the support 108 to the treatment interface 110 through the connection 112. The support 108 enables vertical, horizontal, and rotational movement of the practitioner 120, with the rotational movement being about at least one of three axes perpendicular to one another.

In the illustrated embodiment, the above described height adjustment of the support 108 can be used to transfer weight of the practitioner 120 through the connection 112 to the treatment module and accordingly, the contact surface 208, to apply a practitioner force. As an example, when the contact surface 208 of the treatment module is at a target point and the connection 112 is locked such that the treatment module is fixed relative to the seat, then the height adjustment can be engaged to permit weight of the practitioner 120 to cause the seat to lower by the force of gravity on the practitioner 120, and accordingly the force from the weight of the practitioner 120 is transferred through the connection 112 to the treatment module and the contact surface 208 is thus brought to bear against the target point.

Further in the illustrated embodiment, the above described horizontal movement of the support 108 can be used to transfer force through the connection 112 to the treatment module and accordingly, the contact surface 208, to apply a practitioner force. As an example, when the contact surface 208 of the treatment module is at a target point and the connection 112 is locked such that the treatment module is fixed relative to the seat, then the support 108 can be moved horizontally toward the target point by the practitioner 120 using his or her feet 138 to pull the base 136 across the floor when the wheels 130 are not locked, to cause such horizontal movement, and accordingly the force from this horizontal movement of the practitioner 120 is transferred through the connection 112 to the treatment module and the contact surface 208 is thus brought to bear against the target point.

Further in the illustrated embodiment, the above described rotational movement of the support 108 can also be used to transfer force through the connection 112 to the treatment module and accordingly, the contact surface 208, to apply a practitioner force. As an example, when the contact surface 208 of the treatment module is at a target point and the connection 112 is locked such that the treatment module is fixed relative to the seat, then the support 108 can be rotated, either by the practitioner 120 using his or her feet 138 to rotate the base 136 on the wheels 130 when the wheels 130 are not locked or by the rotation of the support column 142 when the wheels 130 are locked, to cause such rotational movement, and accordingly the force from this rotational movement of the practitioner 120 is transferred through the connection 112 to the treatment module and the contact surface 208 is thus brought to bear against the target point.

Figure 26:
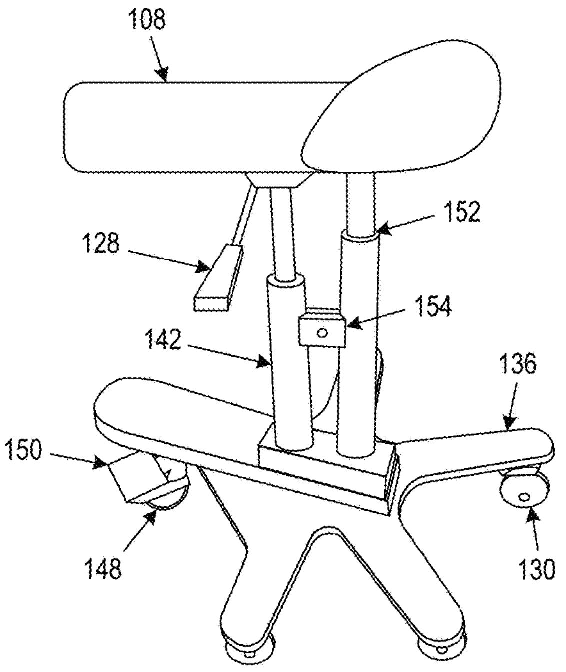
FIG. 26 illustrates a reinforced support column of a treatment force application device of an embodiment of the invention.

Referring now to FIG. 26, in certain embodiments of the invention a support column 142 of the treatment force application device can be selectively reinforced to alternately allow and prevent rotation of the support column 142. In the illustrated embodiment, the treatment force application device includes a support column 142 that can be rotated about its longitudinal axis, and a reinforcement column 152. The reinforcement column 152 is parallel to the support column 142 and attached to the support 108 and the base 136. A reinforcement lock 154 selectively connects and disconnects the reinforcement column 152 from the support column 142, such that when the reinforcement lock 154 is disengaged, the support column 142 is allowed to rotate, and when the reinforcement lock 154 is engaged, the support column 142 is prevented from rotating due to the immobility of the reinforcement column 152. Preferably, as illustrated, the reinforcement column 152 has a telescope design allowing it to be height adjusted along with any height adjustments of the support column 142. The invention also encompasses other configurations, components, elements, and features that accomplish selective reinforcement of the support column 142 to alternately allow and prevent rotation of the support column 142, including without limitation braces, blockers, stoppers, and other locks.

Figure 27:
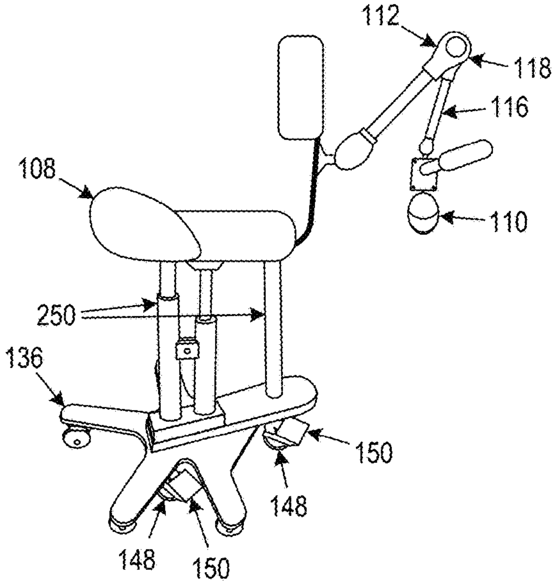
FIG. 27 illustrates a force transfer column of a treatment force application device of an embodiment of the invention.

Referring now also to FIG. 27, additionally or alternatively one or more force transfer columns 250 can be provided, each extending, for example, from the support 108 to a point on the base 136 above a corresponding rubber stopper 148. One or more of the force transfer columns 250 not only can be configured as a reinforcement column 152 as in FIG. 25, but also, when the corresponding rubber stopper 148 is engaged (for example, by a foot pedal 150), can serve as an anchor that functions as a brace to enhance the stability of the connection 112, due to the inclusion of the force transfer column 250 in a force transfer conduit extending from the treatment interface 110, through the arm segments 116 and joints 118 of the connection 112, through the support 108, through the force transfer column 250, through the rubber stopper 148 to the floor.

Further referring to FIGS. 1-5, with regard to the support 108 enabling movement of the practitioner 120 to provide a practitioner force, and the practitioner force being transferred from the support 108 to the treatment interface 110 through the connection 112, the support 108 includes at least one flexible brace 156 against which the practitioner 120 can press to provide the practitioner force.

In the illustrated embodiment, the seat has extending vertically from it a brace 156 to which the connection 112 between the seat and the treatment module is attached, and the brace 156 is adjacent the practitioner's torso 158 when the practitioner 120 is sitting in the seat. The practitioner 120 can lean against the brace 156 with the practitioner's torso 158 to, when the connection 112 is locked, cause the connection 112 to move in accordance with the force, and consequently cause the treatment module to move in accordance with the force. Accordingly, the practitioner force can be used to apply treatment or otherwise affect the target of the force. Preferably, the support 108 is shaped or otherwise configured to accommodate arms of the practitioner 120, and/or provide surfaces on which the practitioner's arms can rest, while operating the device 100.

Figure 6:
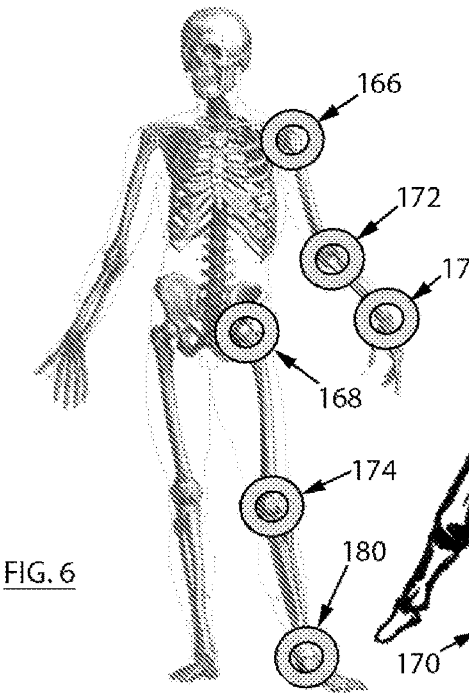
FIGS. 6-11 illustrate a connection of a treatment force application device of an embodiment of the invention in comparison with human joints and appendages.
Figure 7:
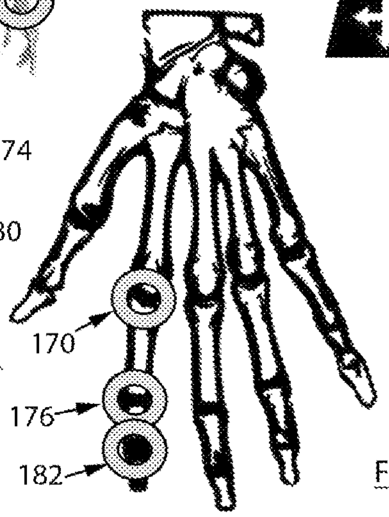
Figure 8:
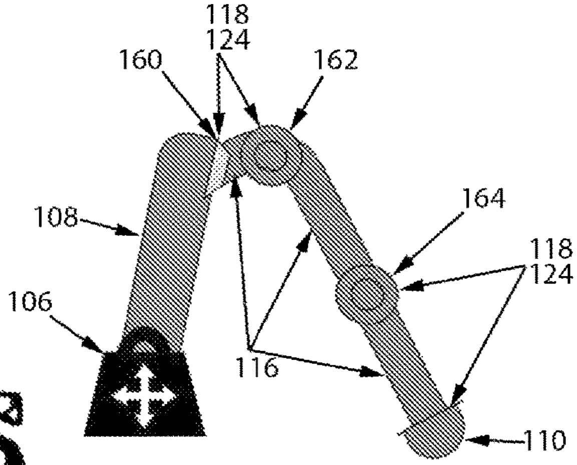

Referring now to FIGS. 6-8, the arm 114 of the treatment force application device of FIGS. 1-5 is illustrated in comparison to natural joints of a human body. The invention encompasses embodiments in which the connection 112 includes any number of arms having any number of segments with any type or manner of articulation. However, the connection 112 preferably includes an arm 114 with three segments 116 and three articulating joints 118, similar to the tetrapod limb of biological vertebrates such as humans, as well as the fingers of similarly digitally equipped animals. A proximal articulated joint 160 can be compared to the shoulder 166 or hip 168 joints of human arms and legs, or the metacarpophalangeal joints 170 of human hands. An intermediate articulated joint 162 can be compared to the elbow 172 or knee 174 joints of human arms and legs, or the proximal interphalangeal joints 176 of human hands. A distal articulated joint 164 can be compared to the wrist 178 or ankle 180 joints of human arms and legs, or the distal interphalangeal joints 182 of human hands. It is contemplated that such an arm is as equally or more capable of producing force as such corresponding human limbs and appendages. It is intended, though not required, that the treatment force application device be superior to natural means of force application, at least with respect to having an advantage of avoiding repetitive stress injuries to a traditional practitioner. In certain embodiments, the invention replicates the human body with respect to its ability to apply forces to tissues, especially by those skilled in manual therapy practices such as neuromuscular, trigger point, acupressure, and orthopedic and medical massage.

Figure 9:
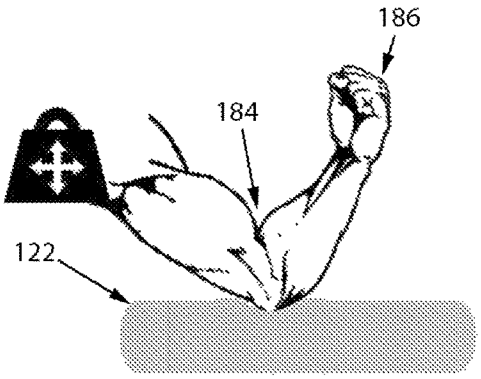
Figure 10:
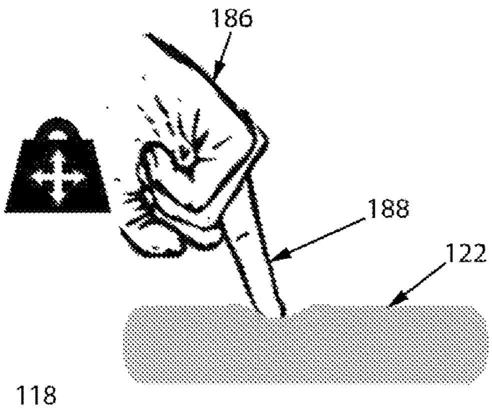
Figure 11:
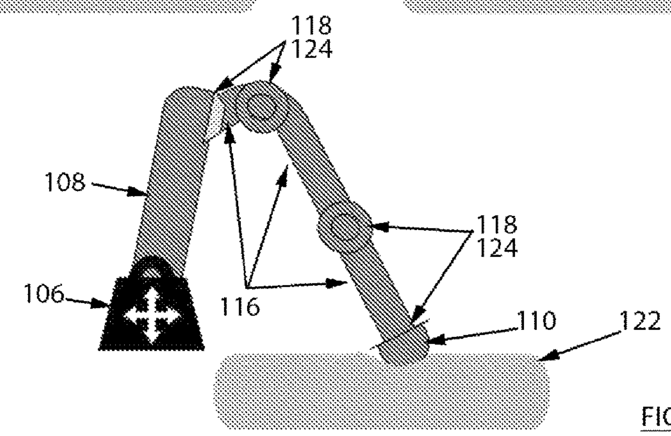

Referring now to FIGS. 9-11, the arm 114 of the treatment force application device of FIGS. 1-5 is illustrated in comparison to natural appendages of a human body applying force utilized in manual therapy. Preferably, the locking universal joints 118 provide reduced-effort, or effortless, as to the practitioner's effort, bracing and transference of force to the ground or other structure through the device instead of through a practitioner's joints and tissues. In manual therapy, human elbows 184 and hands 186 are commonly used to apply force to biological tissues 122 referred to as 'deep tissue.' Maintenance of effective positions for such force application requires the bracing and contraction of skeletal muscles, particularly the stabilizing muscles of the rotator cuff such as the supraspinatus, infraspinatus, subscapularis, and teres minor in addition to many other muscles and delicate structures in the torso, neck, and head down the kinetic chain to the ground. With regard to human fingers 188 and hands 186, the maintenance of the effective positions taxes muscles in the forearm and the rest of the body as they must contract continuously for extended periods to avoid the folding or collapsing of the wrist, elbow, and related joints of the human body. Forces pressing into the fingers 188 from the biological tissues 122 are transferred down the kinetic chain to the ground to keep the force applying finger stiff and rigid. In preferred embodiments of the treatment force application device, locking joints 118 provide reduced-effort, or effortless, as to the practitioner's effort, transference of forces to the ground. A structure under gravity can hang or lean, and can be a grounded stable structure or be connected to the ground via a grounded stable structure. Preferably, the treatment force application device utilizes these and other principles of physics to reproduce or approximate the force transferring abilities of the parts of the human body utilized in manual therapy such as thumbs, fingers, knuckles, wrists, forearms, elbows, shoulders, feet, knees, and hips, and accordingly serves as an equivalent or superior substitute for use in manual therapy.

Figure 12:
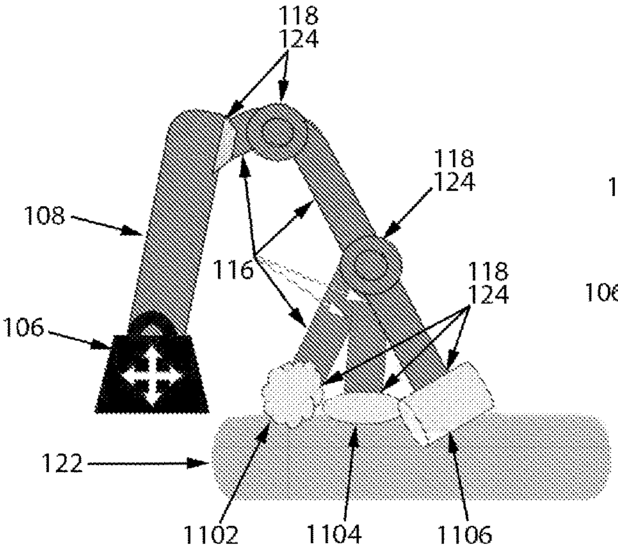
FIGS. 12-13 illustrate connections of certain embodiments of a treatment force application device of the invention.

Referring now to FIG. 12, a treatment force application device of an embodiment of the invention similar in common respects to the treatment force application device illustrated in FIGS. 1-5, is illustrated in partial side view with additional or alternate features. As illustrated, in certain embodiments, the treatment force application device can include a plurality of arm segments extending from the distal-most universal joint, each with a different treatment interface. The treatment interfaces 1102, 1104, 1106 can each be shaped or otherwise configured to serve a desired function with regard to applying force or other treatments to biological tissues. In these and other embodiments, the different treatment interfaces can be readily available as necessary.

Figure 13:
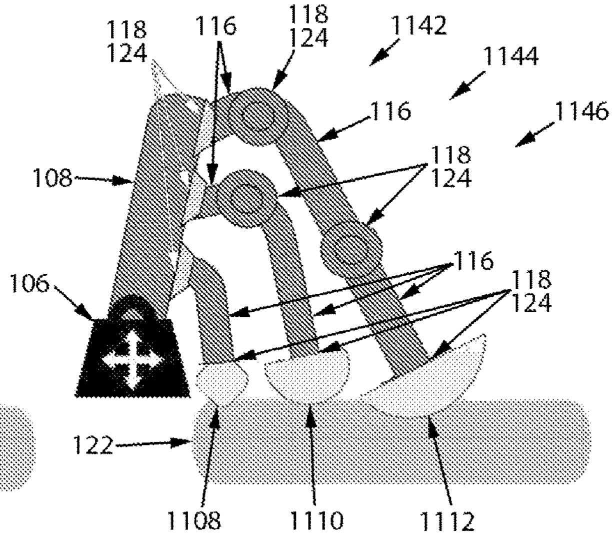

Referring now to FIG. 13, a treatment force application device of an embodiment of the invention similar in common respects to the treatment force application device illustrated in FIGS. 1-5, is illustrated in partial side view with additional or alternate features. As illustrated, in certain embodiments, the treatment force application device can include a plurality of arms, each having a different number of arm segments, extending from the support 108, each having a different treatment interface. The different arms 1142, 1144, 1146 can be configured for different treatment purposes, and the treatment interfaces 1108, 1110, 1112 can each be shaped or otherwise configured to serve a desired function with regard to applying force or other treatments to biological tissues 122. In these and other embodiments, the different arms and the different treatment interfaces can be readily available as necessary.

Figure 14:
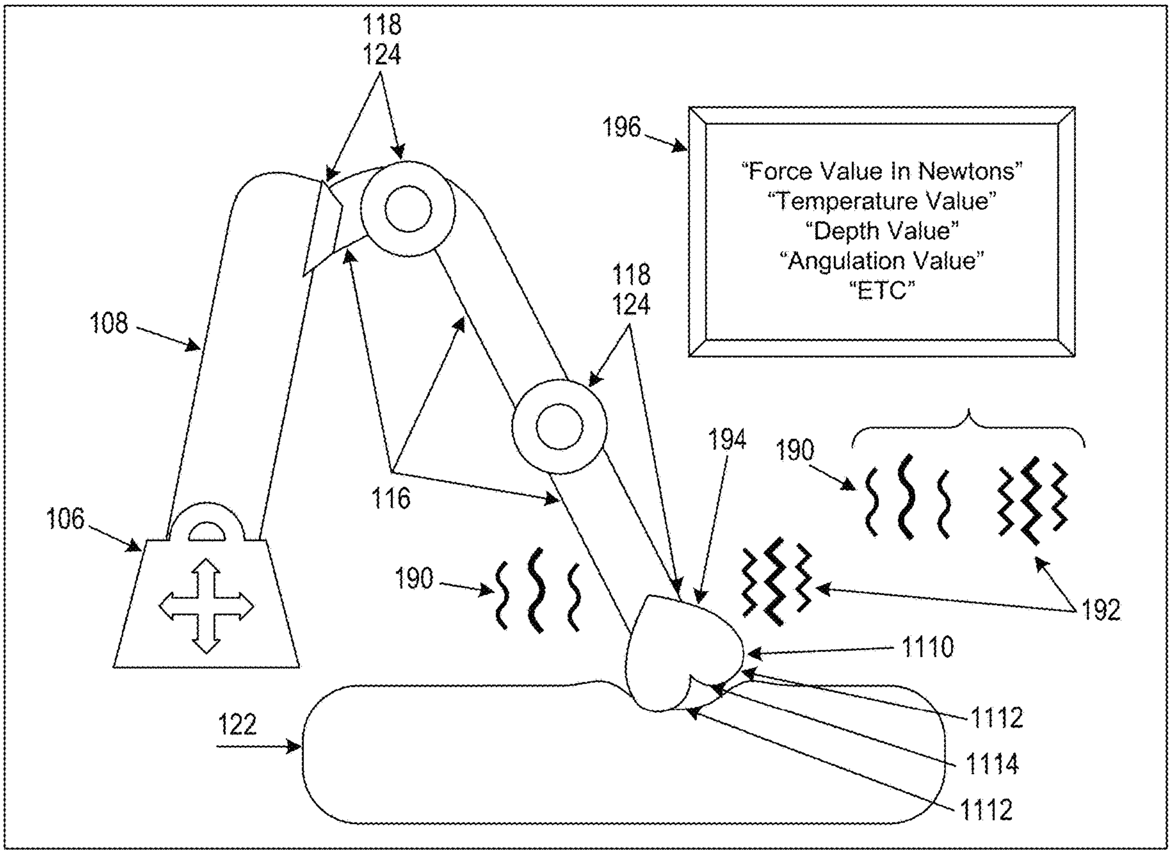
FIG. 14 illustrates a connection of an embodiment of a treatment force application device of the invention, showing a treatment interface with treatment and data collection features.

Referring now to FIG. 14, a treatment force application device of an embodiment of the invention similar in common respects to the treatment force application device illustrated in FIGS. 1-5, is illustrated in partial side view with additional or alternate features. In certain embodiments, the treatment force application device includes a plurality of integrated or interchangeable treatment interfaces each shaped to serve a desired function with regard to applying force to biological tissues. As an example, the illustrated treatment interface 1110 provides protruding areas 1112, for imparting greater pressure, adjacent a recessed area 1114, for imparting less pressure. The invention encompasses treatment interfaces of any number and any shape.

Further referring to FIG. 14, in preferred embodiments, the treatment force application device of the invention additionally or alternatively provides or utilizes therapeutic treatments other than force, including without limitation at least one of heat 190 (preferably at a temperature above 98.6 degrees but within safe limits for tissues), cold, moisture, vibration 192, pulsing, ultrasound, radiation, chemicals, and medicine. The treatment applied by the treatment module can be any type or manner of affecting the patient or other target of the treatment, including without limitation those listed. The treatment interface 110 can have interchangeable inserts that provide different treatments.

Further referring to FIG. 14, in preferred embodiments, the treatment interface 110 or other part of the device is additionally or alternatively configured for obtaining data related to use of the device. The data can include one or more of biometric data, treatment data, physical data, mechanical data, force data, environmental data, and any other data concerning the device, treatment, practitioner, or patient. In the illustrated embodiment, the treatment interface 110 can detect and collect biometric, force application and pressure data.

Figure 15:
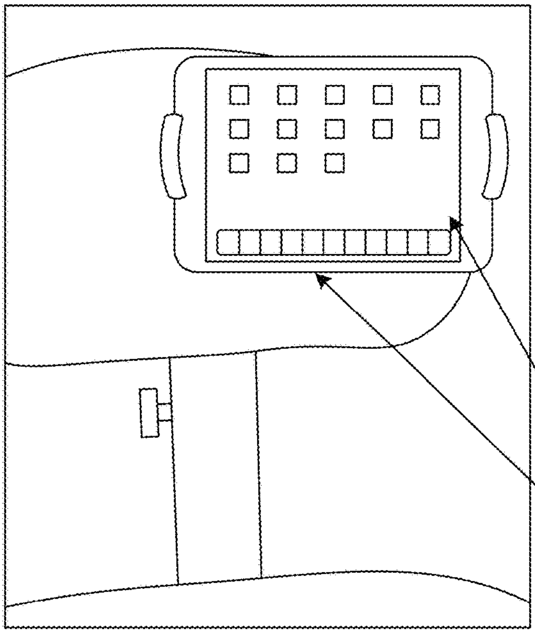
FIGS. 15-16 illustrate data collection and reporting features of certain embodiments of a treatment force application device of the invention.
Figure 16:
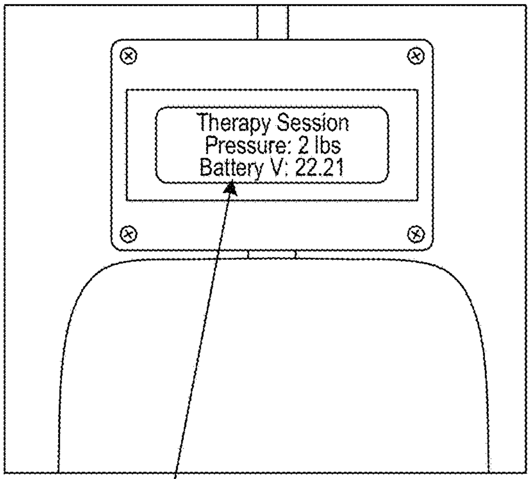

Further referring to FIGS. 14-16, in preferred embodiments, the treatment interface 110 or other part of the device includes at least one sensor configured to obtain the data, and the treatment interface 110 or other part of the device includes an output to report the data. In certain embodiments, the treatment interface 110 is configured with one or more sensors, detectors, analyzers, or other data collection elements, as well as one or more outputs, readouts, displays, sounds, lights, or other data reporting elements. As an example, the illustrated device includes one or more sensors 194 for obtaining biometric, force application and pressure data, and a display 196 for reporting the data. In certain embodiments, the invention includes an app 198 or other software, running on an integrated or separate computing device (for example, a tablet computer 200) that includes, controls, collects data from, reports data from, or is otherwise associated with the above described sensors, displays or other data collection and reporting features. For example, the computing device can be a controller for elements in any data collection components. Further for example, the computing device can be a controller for providing therapeutic treatments including without limitation temperature, vibration, and ultrasound, and displaying information related to such treatments. Preferably the computing device or its display is adjustable with regard to its position.

Figure 19:
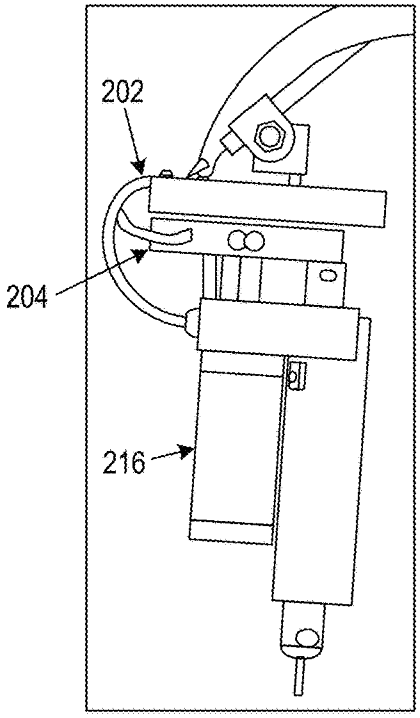
FIG. 19 illustrates a treatment interface of a treatment force application device of an embodiment of the invention, showing motorized cam and pressure data collection features.

Referring now to FIG. 19, with regard to the treatment interface 110 or other part of the device including at least one sensor configured to obtain the data, the treatment interface 110 can additionally or alternatively include a bar 202 and a multimeter 204 to which the bar 202 can bend and accordingly cause pressure to be registered and reported by the multimeter 204.

Referring now to FIG. 17, a treatment force application device of an embodiment of the invention is illustrated in anterior view, showing an additional or alternative feature for providing a treatment force, by movement of the practitioner or otherwise. More particularly, the illustrated treatment force application device includes a steering wheel 206 that can be operated manually by a practitioner. The steering wheel 206 is preferably within reach of a practitioner sitting on the support. Use of the steering wheel 206 to rotate one or more of the joints 118 preferably reduces effort required by the practitioner to move or otherwise use the connection 112 and the treatment module. In certain embodiments, the steering wheel 206 can be operated mechanically, electronically, or by computer hardware and/or software, whether by a practitioner or otherwise. While the treatment force application device is illustrated as including a steering wheel 206 for manipulating an arm 114 with a plurality of arm segments 116, the steering wheel 206 can be included in treatment force application devices that include any number of arms with any number of segments, including without limitation a treatment force application device having a single arm, with a proximal joint rotatable by a steering wheel 206, with a single arm segment 116 of sufficient length with a distal treatment interface 110. This and other embodiments can include a lock, preferably a lever within operational reach of the practitioner, to secure the proximal joint at a desired rotation angle.

Figure 23:
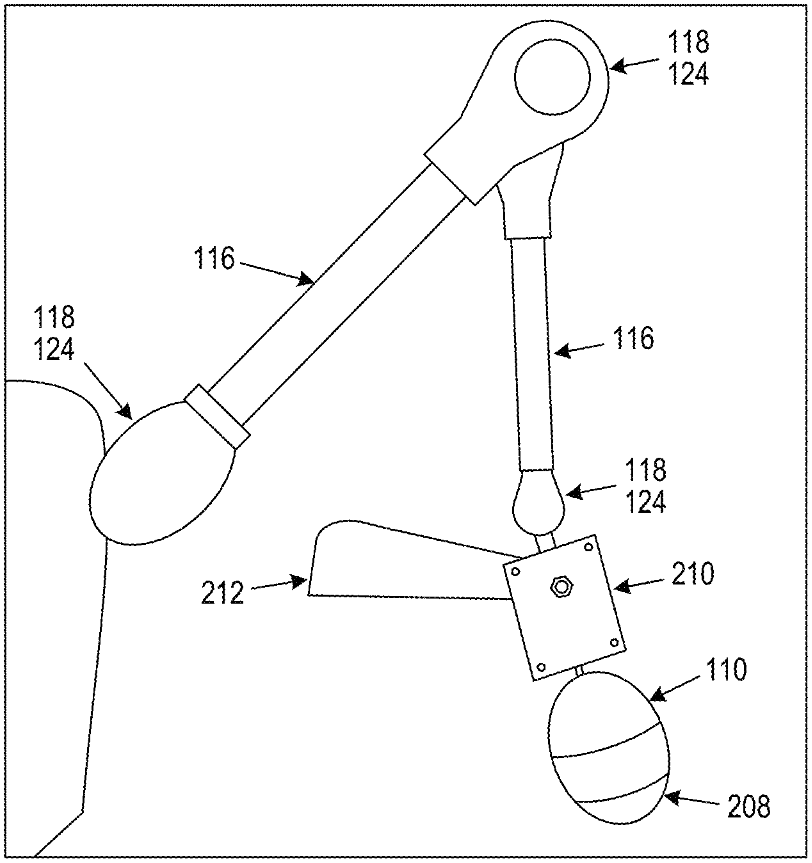
FIGS. 23-25 illustrate a contact surface extension and retraction feature of a treatment force application device of an embodiment of the invention, in side, component, and cutaway views.
Figure 24:
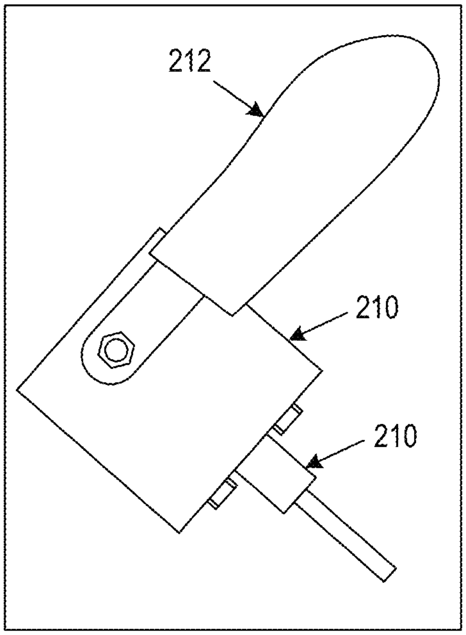
Figure 25:
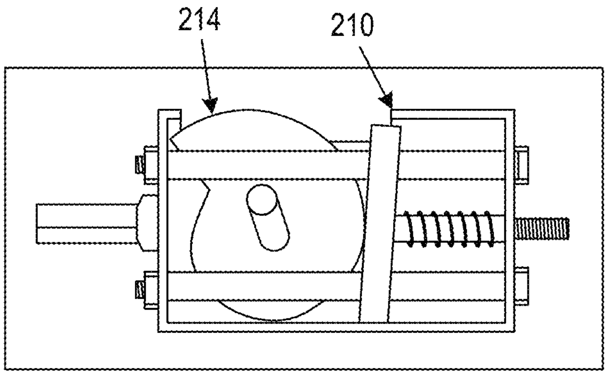

Referring now to FIGS. 23-25, in certain embodiments of the invention a treatment interface includes a contact surface that is extendible and retractable to selectively provide the treatment force.

In the illustrated embodiment, the treatment module has a contact surface 208 that can be the primary point of interaction with the patient or other target of the treatment, and the treatment module is configured with a force application cam 210 that extends and retracts by operation of a force application lever 212 to respectively extend and retract the contact surface 208 of the treatment interface 110. The cam 210 preferably includes a bushing 218 at a point of movement of the cam 210 relative to the casing, to facilitate its operation.

Preferably, the treatment force increases with extension of the contact surface 208 and decreases with retraction of the contact surface 208. Accordingly, the contact surface 208 can be extended outwardly, and retracted inwardly such that if the contact surface 208 is adjacent the patient or other target of the treatment, extending the contact surface 208 causes a force to be applied, and retracting the contact surface 208 relieves the force.

Further preferably, increases and decreases of the treatment force respectively due to the extension and retraction are logarithmic. That is, in some embodiments of the invention, extending the contact surface causes a force to be applied according to a logarithmic scale, and retracting the contact surface causes a force to be relieved according to a logarithmic scale. In the illustrated embodiment, an internal mechanism 214 of the cam 210 effects the logarithmic increases and decreases of the force.

Referring again to FIG. 19, with regard to the treatment interface including a contact surface that is extendible and retractable to selectively provide the treatment force in certain embodiments of the invention, the treatment interface can additionally or alternatively include a motor 216 that is operable to extend and retract the contact surface 208 of the treatment interface 110.

Figure 28:
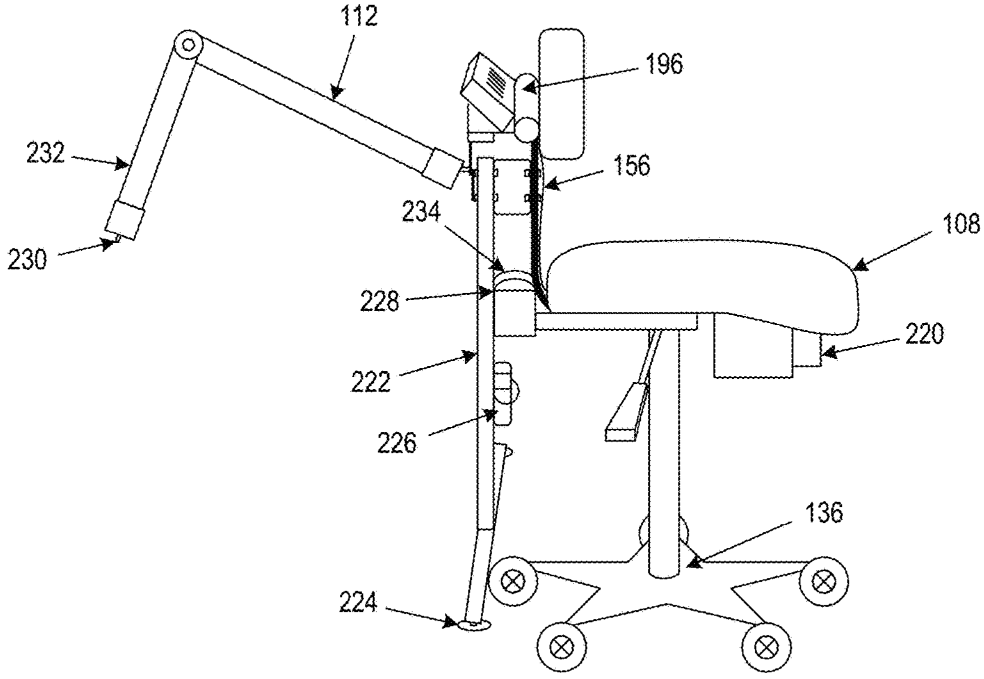
FIG. 28 illustrates a treatment force application device of an embodiment of the invention, showing various additional or alternate features.
Figure 29:
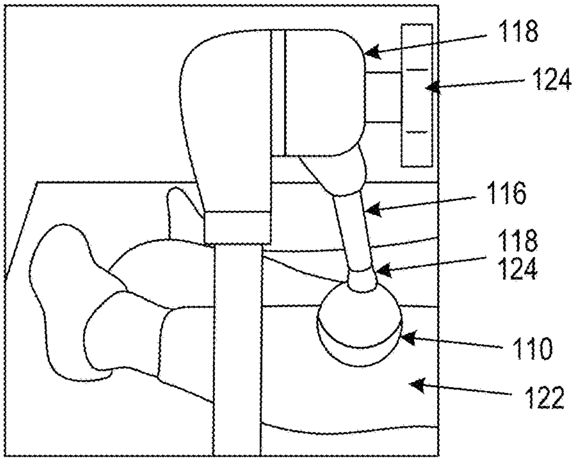
FIGS. 29-34 illustrate a connection and treatment interface of a treatment force application device of an embodiment of the invention, in operation for treatment of a patient, in various views.
Figure 32:
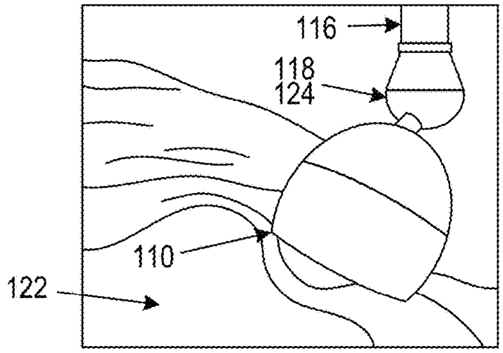
Figure 30:
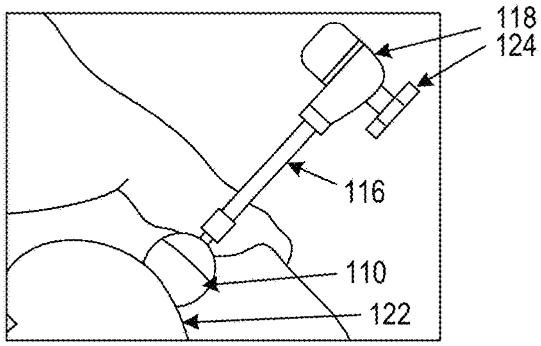
Figure 33:
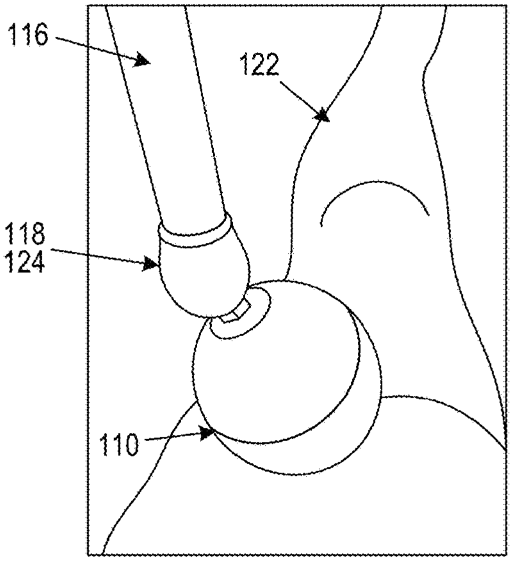
Figure 31:
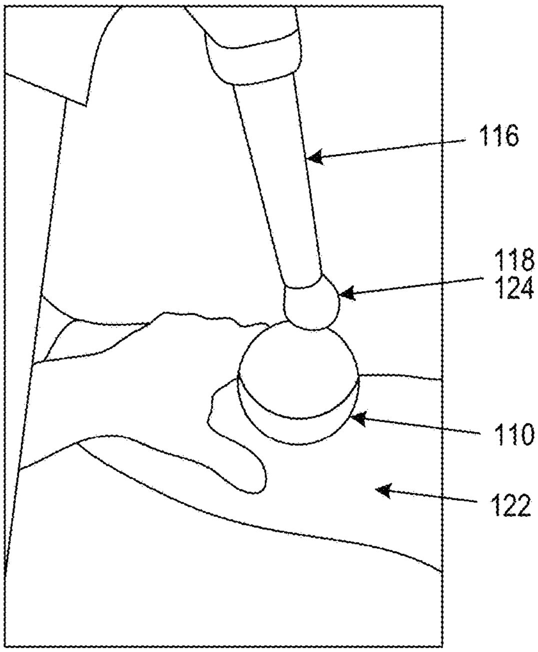
Figure 34:
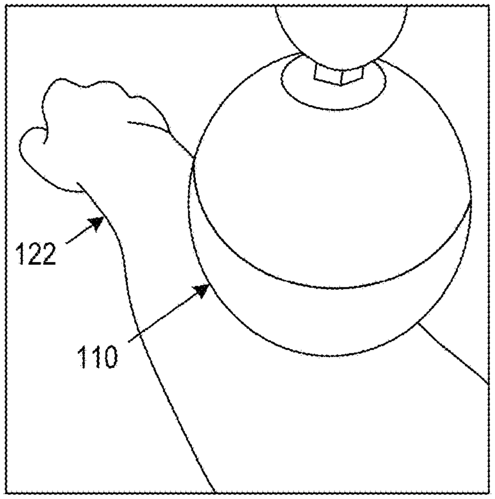
Figure 35:
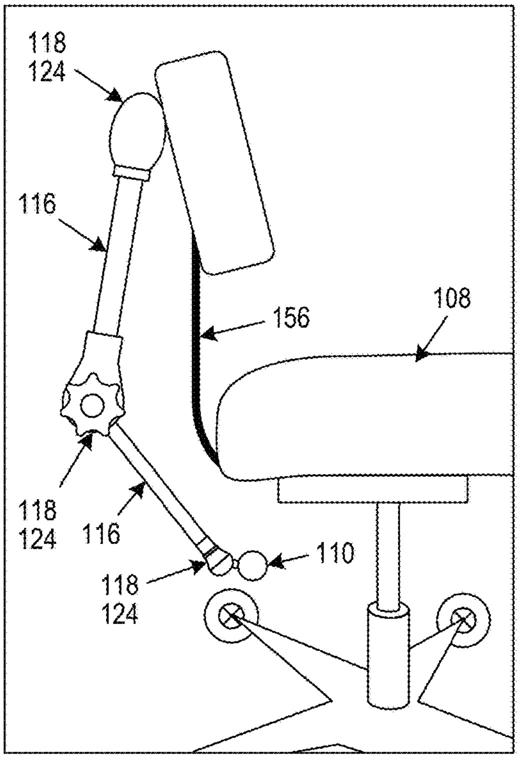
FIGS. 35-38 illustrate a treatment force application device of an embodiment of the invention, showing a connection and treatment interface, in various views.
Figure 36:
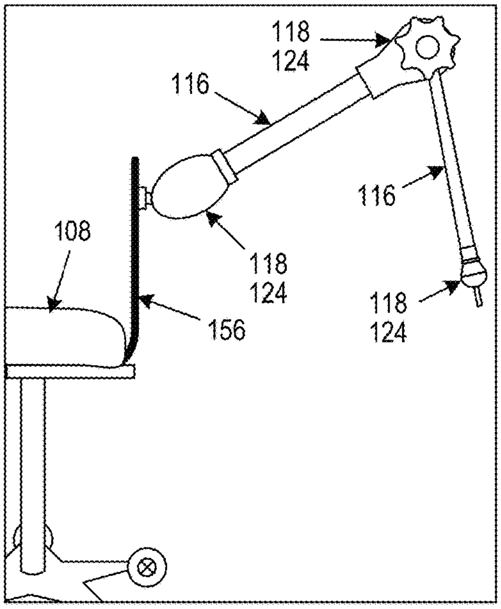
Figure 37:
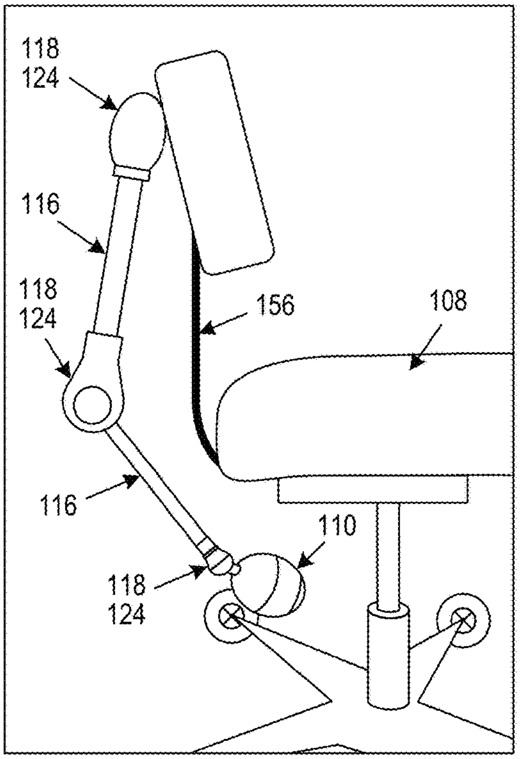
Figure 38:
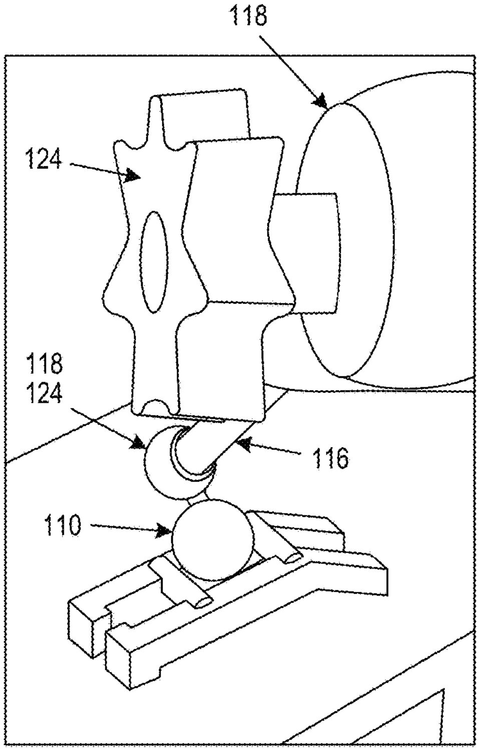

Referring now to FIG. 28, in certain embodiments of the invention, the treatment force application device can have one or more additional or alternate features. In the illustrated embodiment, the device includes a power source, such as, for example, a battery pack 220 that is used to power components of the device as necessary. For example, the battery pack 220 can power motors, sensors, and displays. Preferably, the battery pack 220 is positioned to not interfere with the movement and operation of the treatment force application device. In the illustrated embodiment, the battery pack 220 is located under the support 108.

Further referring to FIG. 28, in the illustrated embodiment, the treatment force application device includes an anchor, such as, for example, a support beam 222 with rubber pads 224 that when engaged, braces the connection 112 and serves as a lock 132 to prevent movement of the support 108. The support beam 222 can be disengaged to allow movement of the support 108 through use of the wheels. In the illustrated embodiment, the support beam 222 is engaged by being lowered until the pads 224 are in forceful contact with the floor, and disengaged by being raised until the pads 224 are separated from the floor. The movement of the support beam 222 is preferably effected by a support beam motor 226 that is mechanically connected to the support beam 222, powered by the battery pack 220, and activated by a support beam control switch 228. One or more holes in the support beam 222 and corresponding spring-loaded pins that fit in the holes provide a mechanism for gross height adjustment of the support beam 222 to accommodate height adjustments of the seat of the support 108.

Further referring to FIG. 28, in the illustrated embodiment, the treatment force application device includes a cam 230 powered by a cam motor 232 that is mechanically connected to the cam 230, powered by the battery 220, and activated by a cam control switch 234. The cam 230 can be operated to extend and retract a contact surface 208 of a treatment interface 110.

Further referring to FIG. 28, in the illustrated embodiment, the treatment force application device includes a pressure sensor and the display 196 illustrated in FIG. 16. In the illustrated embodiment, the display 196 is powered by the battery 220 and reports data obtained from the pressure sensor.

Figure 39:
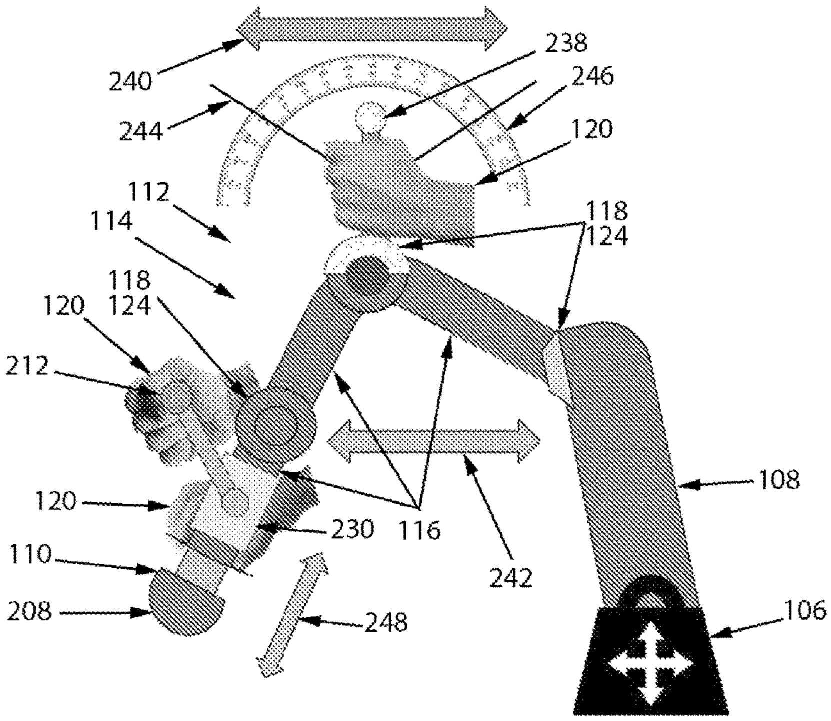
FIG. 39 illustrates a treatment force application device of an embodiment of the invention, showing various additional or alternate features of a connection and treatment interface.

Referring now to FIG. 39, in certain embodiments of the invention, the treatment force application device includes a support 108, a treatment interface 110, and a connection 112 between the support 108 and the interface 110. The connection 112 includes an arm 114 having a plurality of segments 116 with movable joints 118 that have locks 124 that can be locked by operation of a lock lever 238. The treatment interface 110 has a contact surface 208 that can be extended and retracted by operation of a force application lever 212. A cam 230 is illustrated as a component of the extension and retraction feature.

Preferably, one or both of the lock lever 238 and the force application lever 212 are operable as carry handles to maneuver the arm 114. Further preferably, one or both are curved and padded to assist with their use. Further preferably, the range of motion of the lock lever 238 from unlocked to locked is approximately 100 degrees, as illustrated by black lines 244 and a protractor image 246, and the range of motion of the force application lever 212 from minimum force to maximum force is 100 degrees. Arrows 240 depict operation of the lock lever 238. Arrows 242 depict operation of the force application lever 212 as a handle for manipulating the position of the treatment interface 110. Arrows 248 depict operation of the force application lever 212 to extend and retract the contact surface 208.

In certain embodiments of the invention, the force application lever 212 has a mechanism that provides feedback as pressure increases. Some of such mechanisms can be leverage-based, such as, for example, a manual lock that is operable by pushing the lever in towards the arm 114, or screw-based. In certain embodiments of the invention, the force application lever 212 has a mechanism that does not provide feedback as pressure increases. Some of such mechanisms can be gear-based.

Figure 40:
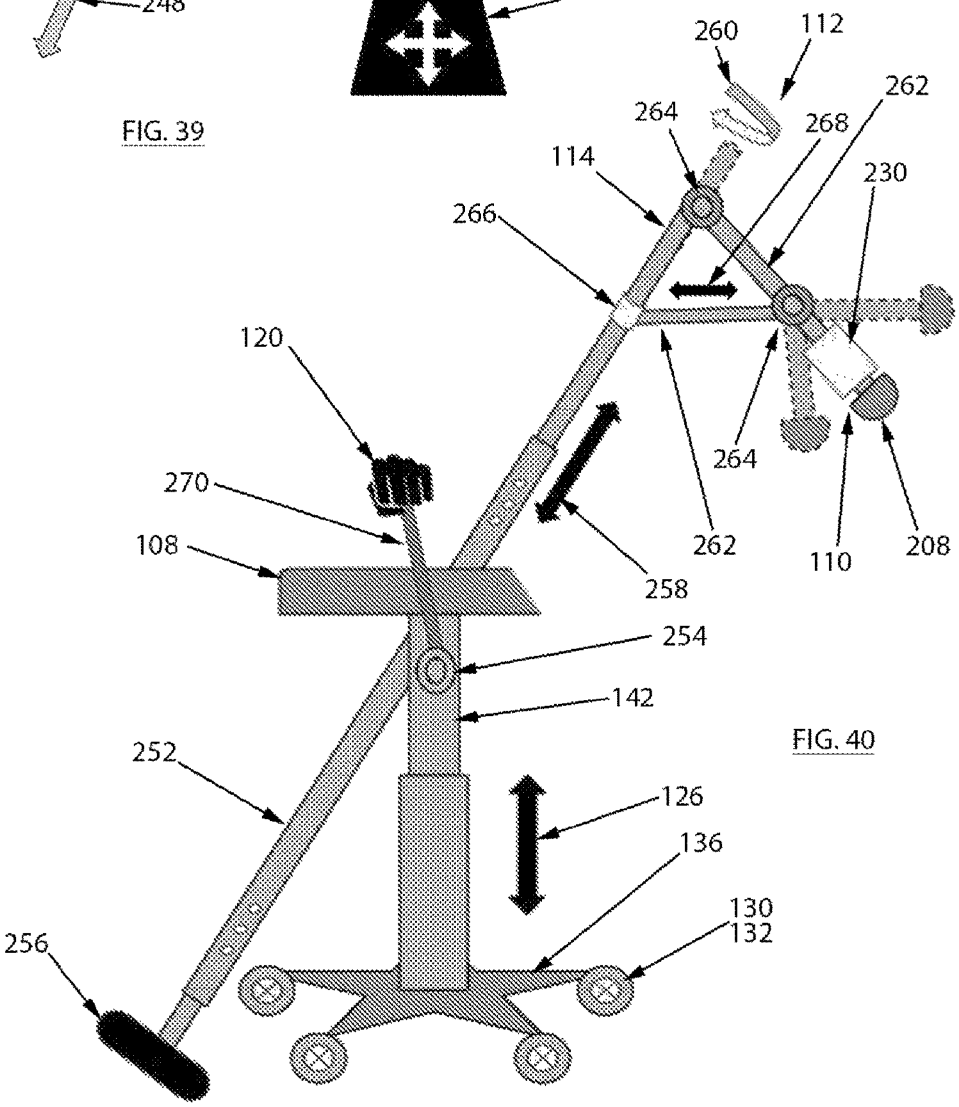
FIG. 40 illustrates a treatment force application device of an embodiment of the invention, showing various additional or alternate features including a reinforcement channel and hinged arm segments.

Referring now to FIG. 40, in certain embodiments of the invention, the treatment force application device can include one or more additional or alternate features. As illustrated, the device includes a support 108, a treatment interface 110, and a connection 112 between the support 108 and the interface 110. The connection 112 includes an arm 114 having a plurality of segments 262 with movable joints or hinges 264. The treatment interface 110 has a contact surface 208 that can be extended and retracted by operation of a cam 230.

Further referring to FIG. 40, in certain embodiments of the invention, the treatment force application device can include a direct, or more direct, connection between the floor and the treatment interface 110 for, among other things, bracing the treatment interface 110 and relieving stress on the practitioner. In the illustrated embodiment, a reinforcement channel 252 establishes a brace, or force support conduit between the floor and the treatment interface 110. The reinforcement channel 252 preferably has a reinforcement foot 256 for establishing a friction lock between the reinforcement channel 252 and the floor. The reinforcement channel 252 preferably can be lengthened and shortened at a lower portion to accommodate different heights of the seat of the support 108. In the illustrated embodiment, the reinforcement channel 252 has a lower telescoping portion for this purpose and others. The reinforcement channel 252 further preferably can be lengthened and shortened at an upper portion to accommodate different desired lengths of the arm 114. In the illustrated embodiment, the reinforcement channel 252 has an upper telescoping portion for this purpose and others. Further in the illustrated embodiment, a reinforcement channel gear 254 and reinforcement channel lock lever 270 can be operated to change the length of the reinforcement channel 252 and lock the reinforcement channel 252 at a desired length.

Further referring to FIG. 40, in certain embodiments of the invention, the treatment force application device can include a scissoring adjustment mechanism for positioning the treatment interface 110. In the illustrated embodiment, arm segments 262 are connected by hinges 264 and can be brought toward and away from one another at their proximal ends, to adjust the position of the treatment interface 110 at their distal ends, by movement of a segment coupling 266 along the reinforcement channel 252. Preferably, the hinges 264 have locks to selectively prevent and allow movement of the hinges 264, or the segment coupling 266 has a lock to selectively prevent and allow movement of the segment coupling 266.

In FIG. 40, arrows 258 depict length adjustment of the reinforcement channel 252. Arrows 260 depict rotational movement of the reinforcement channel 252 to rotate the segments 262 to desired positions. Arrows 268 depict position adjustment of the segments 262 by movement of the segment coupling 266.

Figure 41:
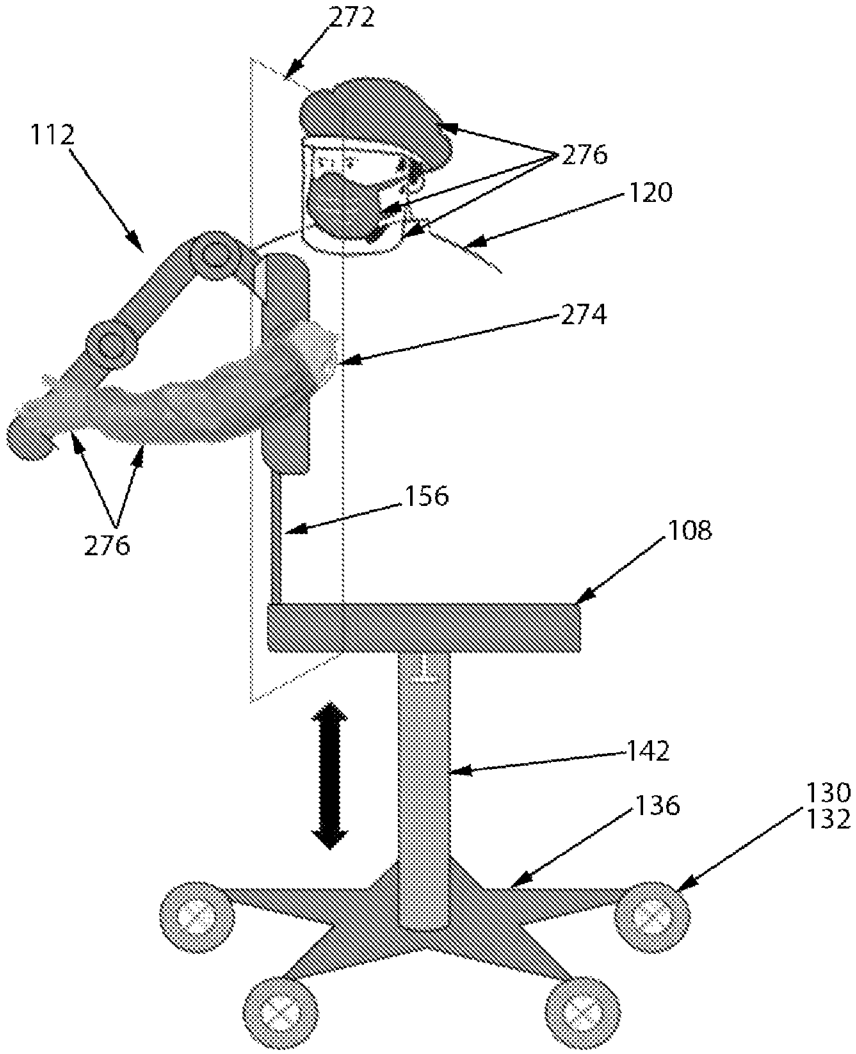
FIG. 41 illustrates a treatment force application device of an embodiment of the invention, having components that facilitate use of the device in hazardous environments.

Referring now to FIG. 41, in certain embodiments of the invention, the treatment force application device can include one or more additional or alternate features, to enable use of the device in hazardous environments. Preferably, the device includes at least one protective element. The protective element preferably, while facilitating use of the device, provides protection for one or more of the practitioner, the patient, and other people or animals in a hazardous environment including without limitation in a pandemic, dangerous environmental conditions, situations requiring physical protection, and situations involving sensitive patients.

As illustrated, the treatment force application device can include a shield 272 as a protective element. The shield 272 can be any suitable barrier to protect one or more of the practitioner 120, the patient, and other people or animals. For example, in a pandemic, in an epidemic, or in other medically hazardous environments including without limitation those in which bacteria, viruses, and other pathogens can be spread from person to person or person to animal and vice versa, the shield 272 can have anti-viral, anti-bacterial, or anti-pathogen properties and/or block bacteria, viruses and other pathogens. Further for example, in a situation involving dangerous environmental conditions, such as, for example, extreme heat, the shield 272 can have thermal insulation properties. Further for example, in a situation requiring physical protection, such as, for example, if a patient is unstable, the shield 272 can be made of a structurally reinforced material. Further for example, in a situation involving sensitive patients, such as, for example, if a patient is sensitive to light, the shield 272 can be made of a material that partially or fully blocks lights.

In preferred embodiments, the shield 272 provides a barrier between the practitioner 120 and the patient. In the illustrated embodiment, the shield 272 is positioned behind and parallel to the flexible brace 156, and accordingly is immediately in front of the practitioner 120 when the practitioner 120 is seated on the support 108. Preferably, the shield 272 enables visibility from one side of the shield 272 to the other, to facilitate use of the device while the shield 272 is in place. In the illustrated embodiment, the shield 272 is transparent. Preferably, the shield 272 includes an accommodation for the practitioner 120 to manipulate the treatment interface 110 and the connection 112 while protected by the shield 272. In the illustrated embodiment, the shield 272 includes an opening 274 through which the practitioner 120, from one side of the shield 272, can position his or her arm to reach the components of the device that are on the other side of the shield 272. Preferably, while operating the device, the practitioner 120 can wear personal protective equipment 276, such as, for example, latex gloves, latex sleeves, a protective cap, a face mask, and a face shield.

Figure 42:
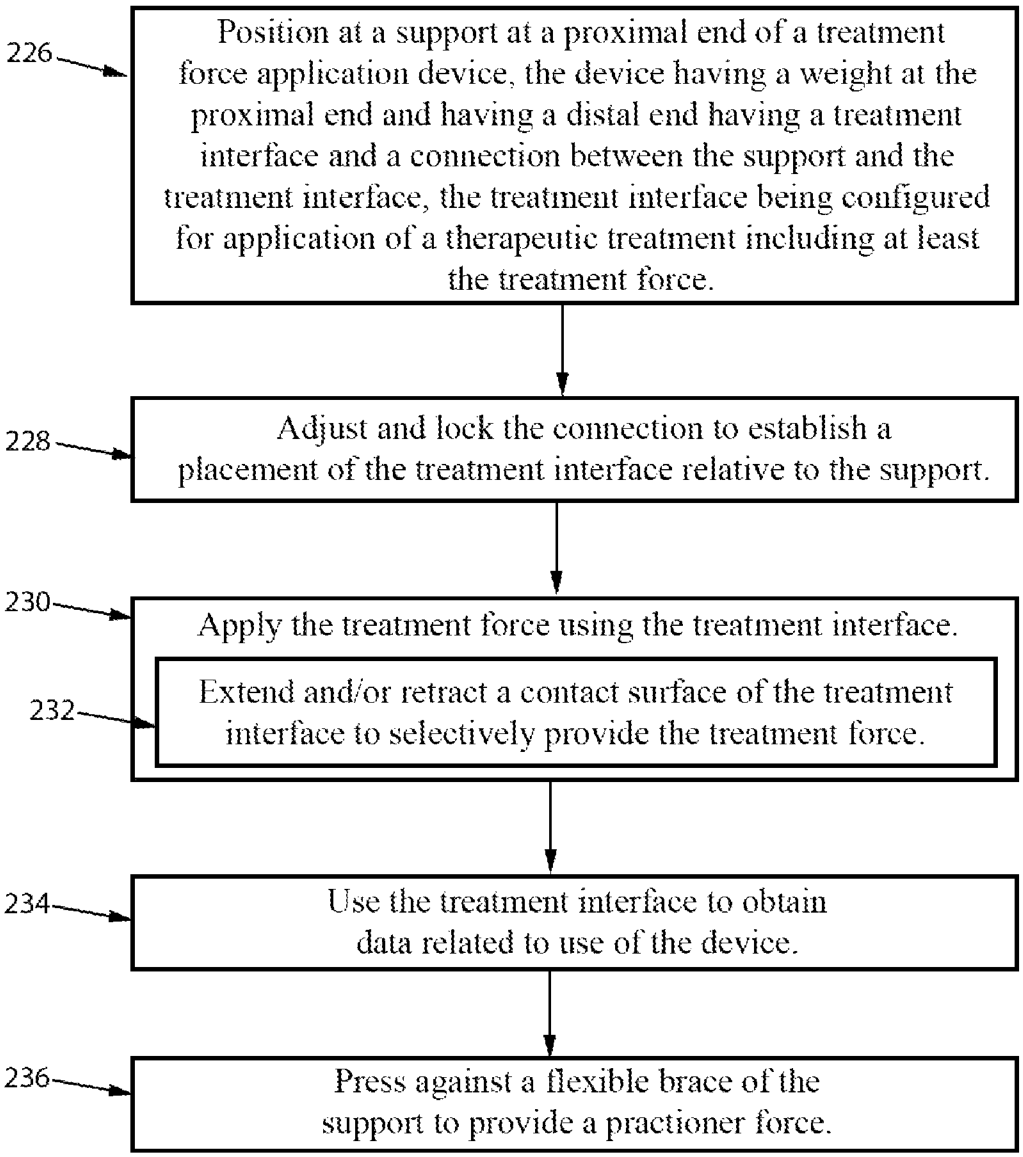
FIG. 42 illustrates a method of using a treatment force application device of an embodiment of the invention.

Referring now to FIG. 42 along with FIGS. 1-5 and 39, in preferred embodiments, a method of applying a treatment force includes, (FIG. 42, Step 226) from a support 108 at a proximal end 102 of a treatment force application device 100, the device having a weight 106 at the proximal end 102 and having a distal end 104 having a treatment interface 110 and a connection 112 between the support 108 and the treatment interface 110, the treatment interface 110 being configured for application of a therapeutic treatment including at least the treatment force; (FIG. 42, Step 228) adjusting and locking the connection 112 to establish a placement of the treatment interface 110 relative to the support 108, the weight being sufficient to substantially prevent movement of the treatment interface 110 relative to the support 108 when the connection 112 is locked; and (FIG. 42, Step 230) applying the treatment force using the treatment interface 110.

As an example, in certain embodiments the method of the invention can include sitting in the seat in an orientation facing the treatment module, grabbing and moving the treatment module while one or more of the universal joints 118 are unlocked, locking the universal joints 118 when the treatment module is at the desired location such that the treatment module is held in position relative to the seat by the rigidity of the arm 114 and the weight of the base 136, and then using the treatment module to apply the treatment force.

The method can be undertaken by any user, whether person, machine, or computer, and through any means, whether purposely, randomly, automated, or by artificial intelligence. The steps described, and any other steps described herein, can be undertaken in any order, and fewer or more steps can be included without departing from the scope of the invention. The components, features, and functionalities of described in the method are in certain embodiments as they are broadly described above and elsewhere herein.

Further referring to FIG. 42 along with FIGS. 1-5, 19, 23-25 and 39, in preferred embodiments, the treatment interface 110 includes a contact surface 208 that is extendible and retractable to selectively provide the treatment force, the treatment force logarithmically increases with extension of the contact surface 208 and logarithmically decreases with retraction of the contact surface 208, and the method further includes (FIG. 42, Step 232) extending and retracting the contact surface 208 to selectively provide the treatment force.

As an example, in certain embodiments the method of the invention can include without limitation extending and retracting the contact surface 208 to apply, or withdraw, the force as needed to effect the treatment, where extending the contact surface 208 causes the force to be applied, and retracting the contact surface 208 causes the force to be relieved. In some of such embodiments, extending the contact surface 208 causes the force to be applied according to a logarithmic scale, and retracting the contact surface 208 causes the force to be relieved according to a logarithmic scale.

Further referring to FIG. 42 along with FIGS. 1-5, 14-16 and 39, in preferred embodiments, the treatment interface 110 is configured for obtaining data related to use of the device, and the method further includes (FIG. 42, Step 234) using the treatment interface 110 to obtain the data.

As an example, in certain embodiments the method of the invention can include without limitation using the treatment module to collect the data related to use of the device, where the treatment module is configured for such collection.

Further referring to FIG. 42 along with FIGS. 1-5 and 39, in preferred embodiments, the support 108 includes at least one flexible brace 156 against which the practitioner can press in at least one of a vertical, horizontal, and rotational movement to provide a practitioner force, the practitioner force being transferred from the support 108 to the treatment interface 110 through the connection 112, and the method further includes (FIG. 42, Step 236) pressing against the brace 156 to provide the practitioner force.

As an example, in certain embodiments the method of the invention can include without limitation leaning against the flexible brace 156 extending from the seat to, when the connection 112 is locked, cause the connection 112 to move in accordance with the force, and consequently cause the treatment module to move in accordance with the force.

Figure 43:
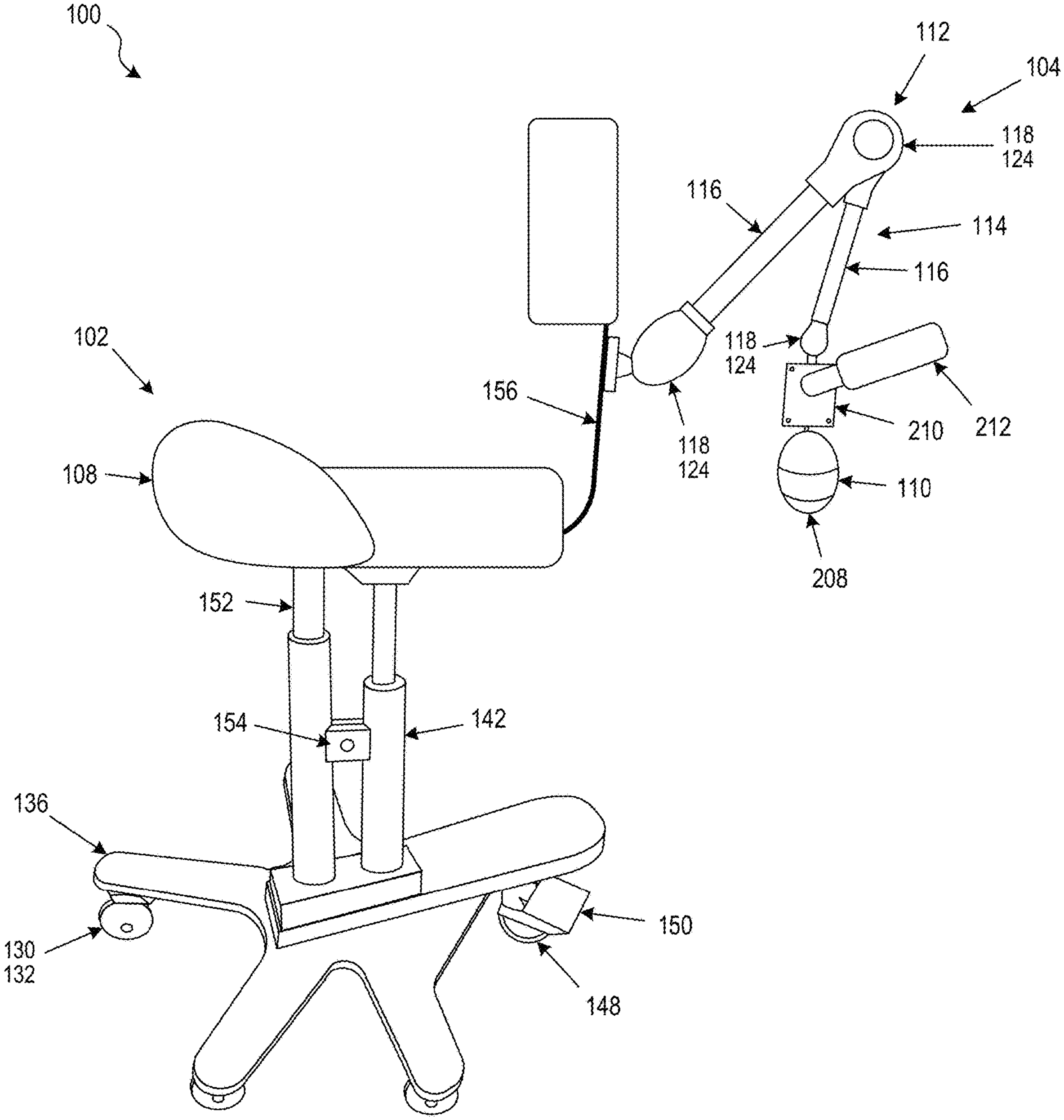
FIG. 43 illustrates a treatment force application device of a preferred embodiment of the invention.

Referring now to FIG. 43, a preferred embodiment of the treatment force application device of the invention is illustrated as having various elements previously discussed. It should be understood that any additional or alternate components, including without limitation those discussed herein with regard to other embodiments, can be made part of the device or made to work with the device. The device has a proximal end 102 and a distal end 104. The proximal end 102 is weighted and has a support 108 for a practitioner. The distal end 104 has a treatment interface 110 configured for applying a therapeutic treatment including at least a treatment force. The device further has a connection 112 between the support 108 and the treatment interface 110. The connection 112 is lockably adjustable by the practitioner to establish a placement of the treatment interface 110 relative to the support 108. The weight is sufficient to substantially prevent movement of the treatment interface 110 relative to the support 108 when the connection 112 is locked.

In the illustrated embodiment, the proximal end 102 has a base 136 and the support 108 includes a seat for the practitioner. The treatment interface 110 is a treatment module and the connection 112 between the support 108 and the treatment interface 110 is an arm 114 with segments 116 connected to one another and to the treatment module and the support 108 by universal joints 118 that can be locked and unlocked, such that a practitioner sitting in the seat and facing the treatment module can lock and unlock the joints 118 and, when the joints 118 are unlocked, move and position the treatment module in real space relative to the seat, and, when the joints 118 are locked, have the treatment module held in position relative to the seat by the rigidity of the arm 114 and the weight of the base 136. In the illustrated embodiment, each universal joint 118 has a lock 124 that can be alternately secured and released. When the lock 124 is secured, it prevents adjustment of the arm 114 at the associated joint 118, and when the lock 124 is released, it allows adjustment of the arm 114 at the associated joint 118. The practitioner can accordingly unlock one or more joints 118 to allow adjustment, and lock one or more joints 118 to prevent adjustment.

In the illustrated embodiment, the support column 142 is reinforced by a reinforcement column 152 and both are telescoping. Accordingly, the height of the seat can be adjusted. The reinforcement column 152 can be locked to the support column 142 using a reinforcement lock 154. Further in the illustrated embodiment, horizontal movement of the support 108 is enabled by one or more wheels 130, and the base 136 includes one or more securable and releasable locks 132 for selectively preventing and allowing movement of the wheels 130. Further in the illustrated embodiment, the support column 142 is configured to rotate about an axis perpendicular to the floor, and can be so rotated when the wheels 130 are locked and the support column 142 is not locked to the reinforcement column 152. Alternatively, the support column 142, when locked to the reinforcement column 152, can be rotated when the wheels 130 are unlocked. A rubber stopper 148 under the base 136 can be operated, by pressing on a foot pedal 150, to selectively slow, temporarily brace, and fully lock the wheels 130.

In the illustrated embodiment, the treatment module has a contact surface 208 that can be the primary point of interaction with the patient, and the treatment module is configured with a force application cam 210 that extends and retracts by operation of a force application lever 212 to respectively extend and retract the contact surface 208 of the treatment interface 110. The treatment force increases logarithmically with extension of the contact surface 208 and decreases logarithmically with retraction of the contact surface 208. Accordingly, the practitioner can apply a treatment force as needed to apply treatment or otherwise affect the target of the force.

In the illustrated embodiment, the seat has extending vertically from it a flexible brace 156 to which the connection 112 between the seat and the treatment module is attached, and the flexible brace 156 is adjacent the practitioner's torso when the practitioner is sitting in the seat. The practitioner can lean against the flexible brace 156 with the practitioner's torso 158 to, when the connection 112 is locked, cause the connection 112 to move in accordance with the force, and consequently cause the treatment module to move in accordance with the force. Accordingly, the practitioner force can be used to apply treatment or otherwise affect the target of the force.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

I claim:

1. A treatment force application device, comprising:
a proximal end having a weighted base and having a seat for a practitioner;
a distal end having a treatment interface configured for applying a therapeutic treatment including at least a treatment force;
a connection between the seat and the treatment interface; and
a reinforcement channel disposed to provide a support between the treatment interface and floor during operation;
wherein the reinforcement channel includes a reinforcement foot configured to allow establishment of a friction lock between the reinforcement channel and the floor;
wherein a length of the reinforcement channel is adjustable at a lower portion to accommodate different heights of the seat for the practitioner;
the connection is configured to be lockably adjustable by the practitioner to establish a placement of the treatment interface relative to the seat; and
the weight is sufficient to substantially prevent movement of the treatment interface relative to the seat when the connection is locked;
wherein the treatment interface and the support are on opposite sides of the connection such the practitioner sitting behind the seat away from the treatment interface and facing towards the treatment interface is able to lock and unlock the connection.

2. The device of claim 1, wherein the connection is configured to be adjustable in six degrees of freedom by manipulation of the treatment interface within reach of the practitioner.

3. The device of claim 1, wherein the connection includes at least one arm having at least one securable and releasable lock for selectively preventing and allowing adjustment of the connection.

4. The device of claim 1, wherein the support is configured to be adjustable with respect to at least one dimension of the practitioner.

5. The device of claim 1, wherein movement of the support is enabled by at least one wheel.

6. The device of claim 5, wherein the proximal end includes at least one securable and releasable lock for selectively preventing and allowing movement of the wheel.

7. The device of claim 1, wherein the support is configured to enable movement of the practitioner to provide a practitioner force, and the practitioner force is transferred from the support to the treatment interface through the connection.

8. The device of claim 7, wherein the support is configured to enable at least one of vertical, horizontal, and rotational movement of the practitioner, the rotational movement being about at least one of three axes perpendicular to one another.

9. The device of claim 8, wherein the support includes at least one flexible brace configured to provide the practitioner force.

10. The device of claim 1, wherein the treatment interface includes a contact surface that is extendible and retractable to selectively provide the treatment force.

11. The device of claim 10, wherein the treatment force increases with extension of the contact surface and decreases with retraction of the contact surface.

12. The device of claim 11, wherein increases and decreases of the treatment force respectively due to the extension and retraction are logarithmic.

13. The device of claim 1, wherein the therapeutic treatment further includes at least one of heat, cold, moisture, vibration, pulsing, ultrasound, radiation, chemicals, and medicine.

14. The device of claim 1, wherein the treatment interface is configured for obtaining data related to use of the device.

15. The device of claim 14, wherein the treatment interface includes at least one sensor.

16. The device of claim 14, wherein the data is selected from the group consisting of biometric data, treatment data, physical data, mechanical data, force data and environmental data.

17. A method of applying a treatment force, the method comprising:

forming a support at a proximal end of a treatment force application device, the device having a weight at the proximal end and having a distal end having a treatment interface and a connection between the support and the treatment interface, the treatment interface being configured for application of a therapeutic treatment including at least the treatment force, wherein the proximal end comprises a weighted base and a seat for a practitioner;

wherein the support comprises a reinforcement channel between the treatment force application device and a floor, wherein a length of the reinforcement channel is adjustable at a lower portion near the floor to accommodate different heights of the seat for the practitioner;

adjusting and locking a scissoring adjustment mechanism of the connection to establish a placement of the treatment interface relative to the support, the weight being sufficient to substantially prevent movement of the treatment interface relative to the support when the connection is locked; and applying the treatment force using the treatment interface;

wherein the treatment interface and the support are on opposite sides of the connection such a practitioner sitting behind the support away from the treatment interface and facing towards the treatment interface is able to lock and unlock the connection.

18. The method of claim 17, wherein the treatment interface includes a contact surface that is extendible and retractable to selectively provide the treatment force, and the treatment force logarithmically increases with extension of the contact surface and logarithmically decreases with retraction of the contact surface, the method further comprising extending and retracting the contact surface to selectively provide the treatment force.

19. The method of claim 17, wherein the treatment interface is configured for obtaining data related to use of the device, the method further comprising using the treatment interface to obtain the data.

20. The method of claim 17, wherein the support includes at least one flexible brace pressable in at least one of a vertical, horizontal, and rotational movement to provide a force, the force being transferred from the support to the treatment interface through the connection, the method further comprising pressing against the brace to provide the force.

* * * * *